United States Patent
Zhou et al.

(10) Patent No.: US 9,996,976 B2
(45) Date of Patent: Jun. 12, 2018

(54) SYSTEM AND METHOD FOR REAL-TIME OVERLAY OF MAP FEATURES ONTO A VIDEO FEED

(71) Applicant: AVIGILON FORTRESS CORPORATION, Vancouver, British Columbia (CA)

(72) Inventors: Shirley Zhou, Herndon, VA (US); Don Madden, State College, PA (US); Tae Eun Choe, Reston, VA (US); Andrew W. Scanlon, Falls Church, VA (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 325 days.

(21) Appl. No.: 14/703,633

(22) Filed: May 4, 2015

(65) Prior Publication Data

US 2017/0039765 A1     Feb. 9, 2017

Related U.S. Application Data

(60) Provisional application No. 61/988,666, filed on May 5, 2014.

(51) Int. Cl.
  G06T 19/00    (2011.01)
  G06T 17/05    (2011.01)
  G06T 7/00     (2017.01)

(52) U.S. Cl.
  CPC .......... *G06T 19/006* (2013.01); *G06T 7/0038* (2013.01); *G06T 7/0046* (2013.01); *G06T 7/0057* (2013.01); *G06T 17/05* (2013.01); *G06T 2207/10016* (2013.01); *G06T 2207/10028* (2013.01); *G06T 2207/10032* (2013.01);
(Continued)

(58) Field of Classification Search
  None
  See application file for complete search history.

(56) References Cited

U.S. PATENT DOCUMENTS 9,380,275 B2 *    6/2016  Davidson, Jr. ........ G01C 21/00
                                                     701/522
2011/0145257 A1*  6/2011  McDonald ................ G06T 1/00
                                                     707/743
(Continued)

*Primary Examiner* — Maurice L McDowell, Jr.
*Assistant Examiner* — Donna J Ricks
(74) *Attorney, Agent, or Firm* — MH2 Technology Law Group, LLP

(57) ABSTRACT

A method is provided for augmenting video feed obtained by a camera of a aerial vehicle to a user interface. The method can include obtaining a sequence of video images with or without corresponding sensor metadata from the aerial vehicle; obtaining supplemental data based on the sequence of video images and the sensor metadata; correcting an error in the sensor metadata using a reconstruction error minimization technique; creating a geographically-referenced scene model based on a virtual sensor coordinate system that is registered to the sequence of video images; overlaying the supplemental information onto the geographically-referenced scene model by rendering geo-registered data from a 3D perspective that matches a corrected camera model; creating a video stream of a virtual representation from the scene from the perspective of the camera based on the overlaying; and providing the video stream to a UI to be render onto a display.

15 Claims, 21 Drawing Sheets

(52) U.S. Cl.
CPC ............... *G06T 2207/30212* (2013.01); *G06T 2207/30241* (2013.01)

(56) References Cited

U.S. PATENT DOCUMENTS

| | | | | |
|---|---|---|---|---|
| 2012/0275510 | A1* | 11/2012 | Jakubczak | H04N 19/649 375/240.02 |
| 2013/0009950 | A1* | 1/2013 | Ben-David | G06T 17/05 345/419 |
| 2013/0339098 | A1* | 12/2013 | Looman | G06Q 10/0637 705/7.36 |
| 2014/0172296 | A1* | 6/2014 | Shtukater | G01S 19/13 701/522 |

* cited by examiner

SYSTEM AND METHOD FOR REAL-TIME OVERLAY OF MAP FEATURES ONTO A VIDEO FEED

CROSS-REFERENCED TO RELATED APPLICATIONS

This application claims priority to and the benefit of the U.S. Provisional Patent Application having Ser. No. 61/988,666, filed on May 5, 2014, entitled "Real-Time Video Overlays," to Shirley Zhou et al., the entirety of which is incorporated by reference herein.

GOVERNMENT RIGHTS

This invention was made with government support under Contract No. FA8501-13-C-0005 awarded by the Department of the Air Force. The government has certain rights in the invention.

FIELD

One or more of the presently disclosed examples is related to real-time overlay of map features onto a video feed.

BACKGROUND

Unmanned Aerial Vehicles ("UAVs") are a critical part of the modern battlefield, providing Intelligence, Surveillance, and Reconnaissance ("ISR") capabilities for all branches of the armed forces and various civilian uses. In recent years, the number of UAV operations has increased dramatically for monitoring, surveillance, and combat-related missions, with the number of deployed UAVs increasing exponentially. However, due to the limited viewing angle and resolution of UAV video, users on the ground lack the appropriate context and situational awareness to make critical real-time decisions based on the video they are watching. Additionally, the camera angles typically found in UAV video can make even familiar terrain and objects difficult to recognize and understand.

Accordingly, it is desirable to provide new systems and techniques to address these and other shortcomings of conventional UAV-video systems.

SUMMARY

In accordance with the present teachings, a method is provided for providing an augmented video feed obtained by a camera of a manned or unmanned aerial vehicle ("UAV") to a user interface ("UI"). The method can comprise obtaining a sequence of video images with or without corresponding sensor metadata from the aerial vehicle; obtaining supplemental data based on the sequence of video images and the sensor metadata; correcting, by a processor, an error in the sensor metadata using a reconstruction error minimization technique; creating, by a processor, a geographically-referenced scene model based on a virtual sensor coordinate system that is registered to the sequence of video images; overlaying the supplemental information onto the geographically-referenced scene model by rendering geo-registered data from a 3D perspective that matches a corrected camera model; creating a video stream of a virtual representation from the scene from the perspective of the camera based on the overlaying; and providing the video stream to a UI to be render onto a display.

In some aspects, the supplemental data comprises one or more of: static geo-referenced datasets, dynamical geo-referenced datasets, traffic conditions, elevation data, terrain data, social media information, waypoint data, light detection and ranging ("LIDAR") data, airspace symbology data, 3D model data, and road maps.

In some aspects, the error in the sensor metadata comprises one or more of: missing data, temporal drift, and spatial drift.

In some aspects, the correcting the error in the sensor metadata is performed for each frame in the sequence of video images, wherein a correction of one video image is used to refine the correction for a subsequent video image.

In some aspects, the correcting the error in the sensor metadata for one image frame is based on another image frame or map data corresponding to a scene that is represented in the one image.

In some aspects, the method can further comprise constructing a depth map using light detection and ranging ("LIDAR") or digital elevation maps ("DEM"); determining that one or more pixels representing overlay objects has low or no visibility for a video frame based the depth map; and rendering the one or more pixels in a manner to represent that the one or more pixels are occluded.

In some aspects, the correcting the error in the sensor metadata further comprises performing a first registration between a video image in the sequence of video images and a corresponding map data; determining an anchor frame from the sequence of video images; and performing a second registration between the video image and the corresponding map data using the anchor frame by minimizing a reprojection error.

In some aspects, the minimizing the reprojection error is performed using the reconstruction error minimization technique according to:
$\min(H)R_{g(v,m,H)} = \min(H)\Sigma_{j=1}^{n}(|p_j^v - Hp_j^m| + |p_j^m - H^{-1}p_j^v|)/n$,
where subject to H to be close to rigid body geometry, and v is a frame of input image, m is cropped map imagery, $R_g$ is reconstruction error of feature points, j where j=1, ..., n, where n is a number of corresponding points.

In some aspects, the reconstruction error is minimized using a Lagrange optimization technique to obtain a final homography between map data and the video images.

In some aspects, the supplemental data comprises information beyond a field-of-view of the camera of the aerial vehicle.

In some aspects, the method can further comprise obtaining a series of waypoint data, wherein the series comprises a beginning waypoint, one or more intermediate waypoints, and a destination waypoint; generating a flight path based on the series of waypoint data; and outputting the flight path to the UI.

In some aspects, the method can further comprise generating the UI that shows the supplemental data overlaid over the video stream and the sensor metadata.

In accordance with the present teachings, a device for providing an augmented video feed obtained by a camera of a manned or unmanned aerial vehicle ("UAV") to a user interface ("UI") is provided. The device can comprise a memory containing instructions; and at least one processor, operably connected to the memory, the executes the instructions to perform a method for providing an augmented video feed obtained by a camera of a manned or unmanned aerial vehicle ("UAV") to a user interface ("UI"), comprising: obtaining a sequence of video images with or without corresponding sensor metadata from the aerial vehicle; obtaining supplemental data based on the sequence of video images and the sensor metadata; correcting, by a processor, an error in the sensor metadata using a reconstruction error minimization technique; creating, by a processor, a geographically-referenced scene model based on a virtual sensor coordinate system that is registered to the sequence of video images; overlaying the supplemental information onto the geographically-referenced scene model by rendering geo-registered data from a 3D perspective that matches a corrected camera model; creating a video stream of a virtual representation from the scene from the perspective of the camera based on the overlaying; and providing the video stream to a UI to be render onto a display.

The present disclosure also provides a computer-readable medium which stores programmable instructions configured for being executed by at least one processor for performing the methods and operations described herein according to the present disclosure. The computer-readable medium can include flash memory, CD-ROM, a hard drive, etc.

BRIEF DESCRIPTION OF FIGURES

The foregoing summary and the following additional description of the illustrative embodiments may be better understood when read in conjunction with the appended drawings. It is understood that potential embodiments of the disclosed systems and methods are not limited to those depicted.

FIG. 10A shows an open multiple view geometry, FIG. 10B shows projections from each sensor to 3 3D points, and FIG. 10C shows projections from each sensor to all the 3D points, according to embodiments.

FIG. 19A shows user 1, occlusion alpha=1, FIG. 19B shows user 2, occlusion alpha=0.5, FIG. 19C shows user 3, occlusion alpha=0.7, and FIG. 19D shows user 4, occlusion alpha 0, according to embodiments.

DETAILED DESCRIPTION

Figure 1:
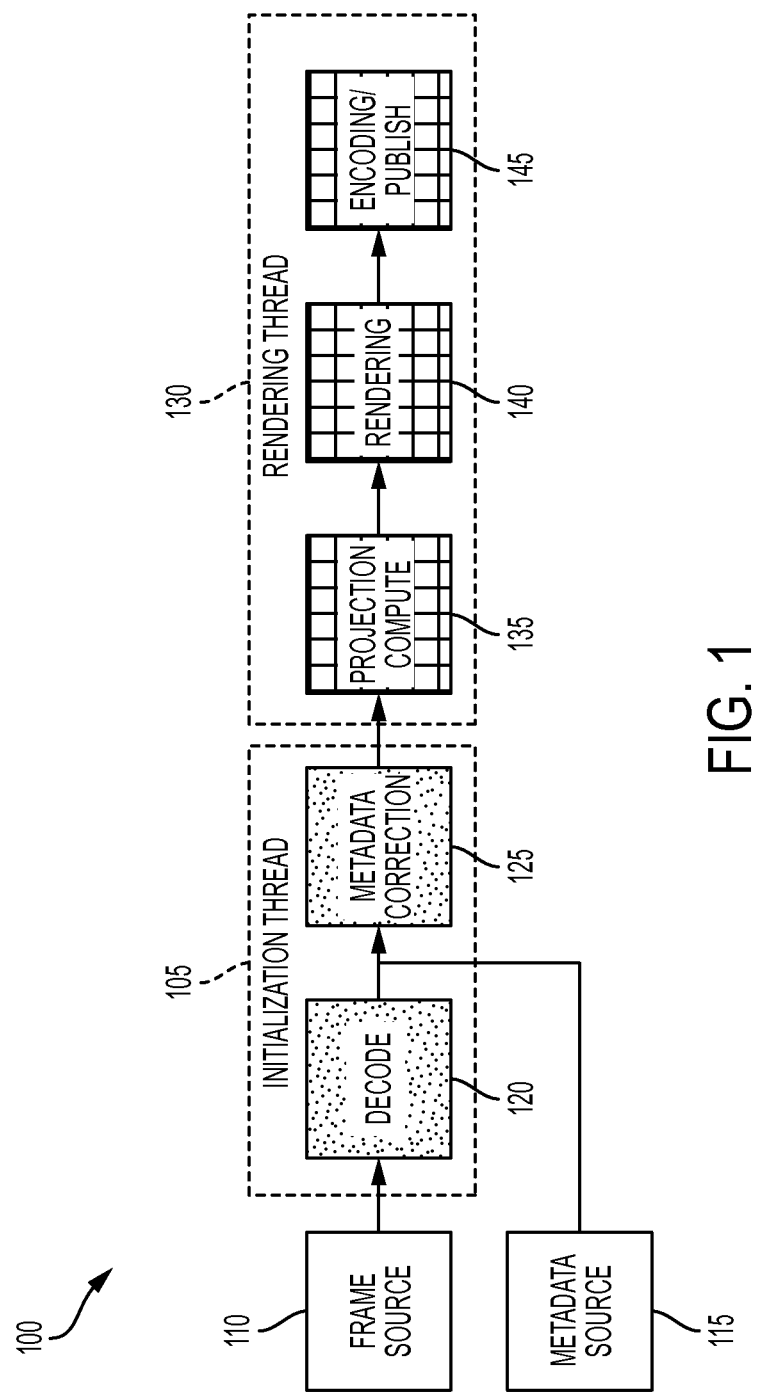
FIG. 1 shows an example conceptual overlay workflow process, according to embodiments.
Figure 2:
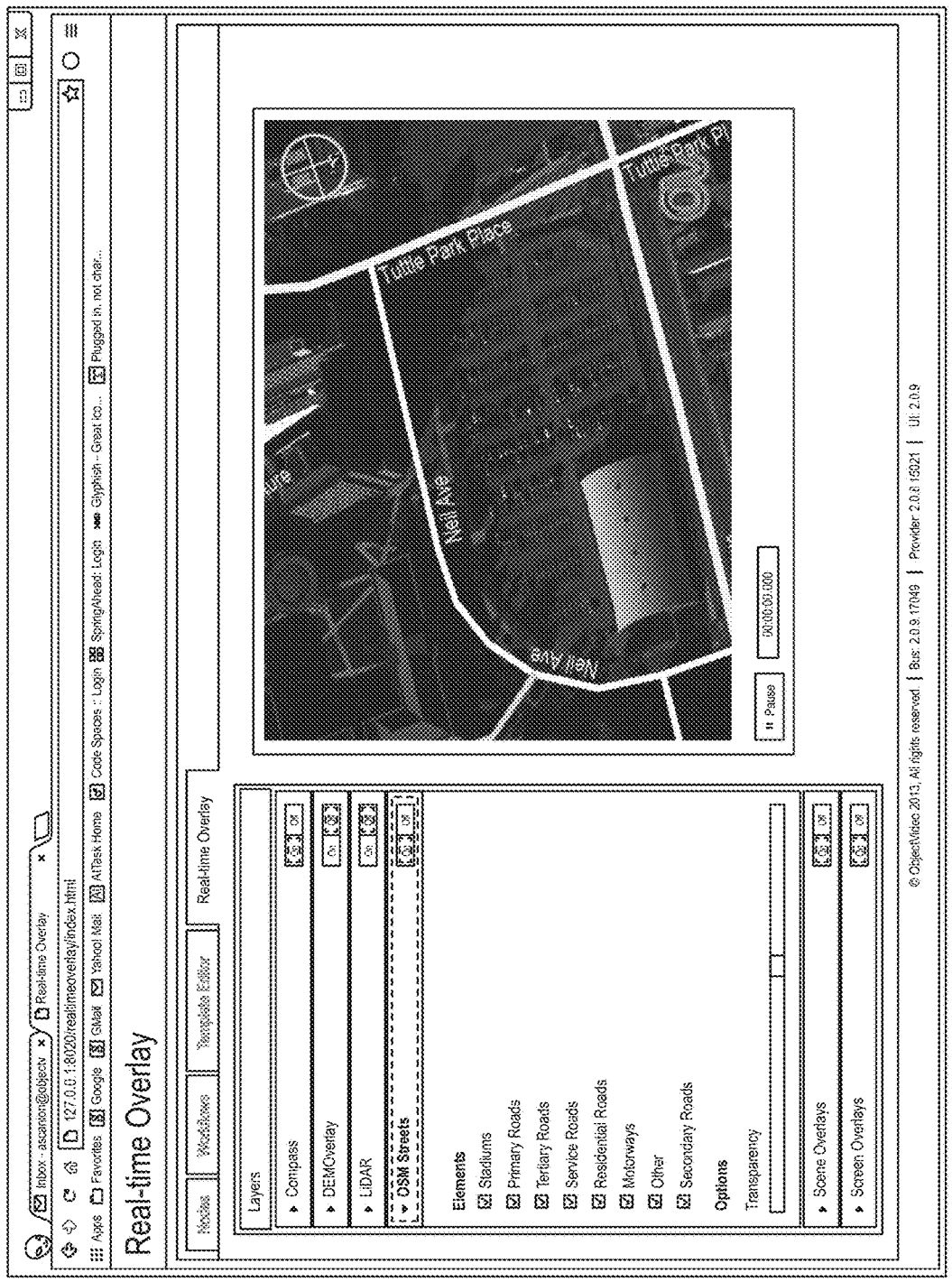
FIG. 2 shows a real-time overlay web-based user interface. Layer selection panel (left) allows users to toggle on/off overlay layers and their sub-elements. Options panels are dynamically built based on the settings exposed by each layer via the options API, according to embodiments.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the described is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. Each reference cited herein is incorporated by reference. The examples and embodiments described herein are non-limiting examples.

A wealth of geo-referenced data is available which can be exploited to aid users of UAV video. Commercially available data sets such as terrain and elevation information, roadways, points of interest, Controlled Airspace Symbology, Restricted Airspace Boundaries, FAA Centers, Air Corridors, and radar and light detection and ranging ("LIDAR" or "LiDAR") information may be overlaid onto video to provide users with the context needed to achieve their missions. Video feeds from airborne sensors such as Predator, ARGUS-IS, ARGUS-IR, Gorgon Stare, and others provide high-resolution imagery from a birds-eye vantage point. While those pixels give analysts an "eye-in-the-sky", today's conventional systems rely on the analyst to interpret the scene without the benefit of additional context. Data such as terrain and elevation information, roadways, points of interest, Controlled Airspace Symbology, Restricted Airspace Boundaries, FAA Centers, radar, and LIDAR data are all readily available and can provide additional situational awareness. Systems, methods, and manufactures consistent with this disclosure improve the UAV-video user experience by adding geo-registered layers from these or other information sources onto aerial video in real-time.

In general, a system, method, and computer-readable medium is provided that improves a user's experience by adding geo-registered layers from one or more information sources onto aerial video in real-time and in an integrated end-to-end overlay system. Image-based geo-registration can also be provided to external reference data for improved overlay accuracy, semi-transparent rendering of occluded elements, and an expanded context view to provide greater situational awareness of regions surrounding the video field-of-view.

The overlay system can be implemented using a distributed, redundant node architecture allowing it to scale to increases in user load and processing requirements. An implemented as a representational state transfer ("REST" or "RESTful") Application Programming Interface ("API") that can allow easy integration with the streaming system. An overlay software development kit ("SDK") can provide tools and interfaces to develop overlay layers for a dataset, including geo- and non-georeferenced data and static and/or dynamic data. The system can include features such as matching, sensor pose optimizations, video codec algorithms, and rendering techniques and can use multi-core Central Processing Unit ("CPU")/Graphics Processing Unit ("GPU") accelerations with Streaming SIMD Extensions (SSE), Microsoft's DirectX11, and NVIDIA's Compute Unified Device Architecture ("CUDA") in order to maximize the processing and rendering performance and minimize latency in the processed video. Output video streams can be encoded using industry standards (WebM), ensuring compatibility with standards-compliant applications and devices. A web-based user interface ("UI") is provided in various implementations, enabling users to view video products using a native HTML5 video widget and customize overlay rendering by toggling data sets on or off, changing colors, transparency, line widths, font sizes of rendered elements and switching between the system's various render modes.

In one example of an implementation, a server-based system is provided to overlay arbitrary sets of geo-referenced supplemental data onto UAV video in real-time. The system is able to cope with challenges that commonly affect this type of functionality, including: i) errors in positional and orientation data from UAVs frustrating attempts to generate accurate overlays; ii) prohibitively high processing requirements for real-time video handling and overlay rendering; iii) a wide diversity of data and formats to manage and overlay; and iv) unintuitive user interfaces which prevent operators from efficiently exploiting overlaid video.

The present system can use a Video & Data Management System ("VDMS") to provide a streaming framework capable for processing data in real-time. The components in this example of an implementation can include one or more of the following: a sensor metadata error correction framework, an overlay engine, an overlay SDK, a web-based user interface, and an overlay test framework.

The sensor metadata error correction framework or module can pre-processes incoming video and metadata streams to correct for errors caused by video jitter, metadata drift, and incorrect metadata states. The sensor metadata error correction module can contain a state-estimation framework that combines information from various sources, such as external reference datasets and inherent scene and video attributes derived from video analytics processes to estimate and correct for jitters and drifts in sensor metadata. A feature-matching framework can also be present that pulls distinguishable landmarks from UAV video and matches them to one or more sets of reference data, such as satellite imagery.

The overlay engine is responsible for handling incoming frames and sensor metadata, as well as performing actual rendering of the overlaid datasets. The overlay engine also handles loading of static and dynamic geo-referenced datasets and other reference information used to aid registration, which singly or collectively can be referred to as supplemental data. The overlay engine can use low-cost, commercial off-the shelf ("COTS") Graphics Processing Unit ("GPU") hardware to perform rendering of the datasets in real-time.

The overlay SDK can be used to aid in integration of arbitrary datasets into the system. The SDK provides third-party integrators with common rendering elements which enable rendering of potentially complex scenes without extensive rendering knowledge or sensor platform knowledge.

The web-based UI is provided to establish a simple integration with the back-end system and to stream overlay video to a web browser. The UI can be provided by using, for example, Microsoft's ASP.NET framework. ASP.NET is a web development framework that enables developers to build feature-rich websites using one of the managed .NET languages. Video handling can be achieved using, for example, a Video LAN Client ("VLC") Media Player browser plug-in. VLC Media Player is an open-source video player by VideoLAN project that supports a variety of video and audio media formats such as H.264, MPEG-2, and MPEG-4. Additionally, an interactive layer manager can be used to allow users to toggle on/off overlay layers using simple checkboxes. The layer manager can communicate with a back-end server using, for example, a RESTful/XML API over HTTP.

The UI can provide controls for video functions such as play, pause, and stop, allow for selection from a static list of overlay datasets (supplemental data), enable end-users to apply one or more overlay layers, configure individual rendering preferences, and/or view both live and archived video streams with selected overlay data. In embodiments, the UI can include screens and controls to query the server back-end for lists of available overlay datasets, present that list to users as selectable layers, and provide mechanisms to configure the appearance of each selected layer that was created. The UI can provide users with additional scene context by displaying overlaid elements immediately adjacent to the UAV's Field-Of-View. The UI can use a VLC video player plug-in or HTML5's native video player, for example, to display the overlay video to users.

The UI can be integrated with the VESPA platform's UI framework and provide features of interest, such as layer specific appearance settings, expanded context displays, and multi-user support. Video display can use HTML's native <video> tag and player. Real-time display of performance metrics can be added to show the impact of individual overlay layers on video latency. The VESPA UI is a web interface implemented using HTML5/CSS/JavaScript that provides access to framework functions, such as creating and managing workflows and system configuration. The UI can feature a configurable tab interface enabling new components to be easily integrated with the interface to provide end-users a seamless user experience. The UI can communicate with the backend server using the RESTful/XML API via Asynchronous JavaScript and XML (AJAX) calls. AJAX is a client-side technology which enables the browser to communicate with the server in the background. Commands may be sent and data retrieved without refreshing the browser providing a more fluid user experience.

The test framework can be a stand-alone application which may load static UAV video data and perform overlay real-time rendering without the need for a full system deployment.

A state-estimation framework can be used to combine information from various sources such as external reference datasets and inherent scene and video attributes derived from video analytics processes to estimate and correct for jitters and drifts in sensor metadata. A feature-matching framework can be used to pull distinguishable landmarks from UAV video and match them to one or more sets of reference data.

In some implementations, the present system is operable to incorporate additional types of reference data, such as DirectX 11, satellite imagery, digital elevation models ("DEMs"), additional maps, and feature sets, to improve sensor metadata correction and overall overlay accuracy and to expose advanced rendering capabilities in the overlay SDK to provide integrators with a greater set of tools to create complex overlay layers. Features, such as specialized rendering modes for occluded overlay elements and an expanded context view showing overlay and reference elements just outside the UAV's field-of-view, can be added to enhance the system's utility.

The overlay modules can be integrated into the Very Extensible Stream Processing Architecture ("VESPA") platform and the end-to-end system can be optimized for hardware accelerated graphics processing to achieve efficient and scalable real-time overlay rendering on multiple streams. VESPA provides a flexible, processing platform for large streams of data such as video and audio, which features a flexible workflow architecture where multiple low-level processing modules are coupled at runtime via an Extensible Markup Language ("XML") configuration file to form a single continuous processing chain. A loose coupling of modules enables simple reuse of common computing tasks and enables new features and formats to be added without a costly re-architecting of the entire system. Additionally, the system provides services, such as thread management, an integrated HTTP server, and management user interfaces. The present overlay system can leverage VESPA to manage required video and sensor metadata streams. Overlay modules can be integrated into the system's plug-in framework, which enables custom processing of ingoing and outgoing data streams. VESPA's interoperable HTTP API supports overlay queries and commands, such as retrieval of available datasets, overlay layer selection, and configuration of rendering preferences.

The present system can also include an overlay asset manager that can be a stand-alone component that provides centralized access to external datasets and reference data (e.g., supplemental data), and to custom plug-in implementations. The overlay asset manager is responsible for discovering custom SDK-implemented overlay renderers, loading static or semi-static overlay datasets, and providing the aforementioned components to each distributed instance of VESPA on-demand.

The real-time overlay ("RTO") processing architecture's two-stages (overlay initialization and overlay rendering) can be broken down into independent modules. VESPA's modular architecture allows the separation of the video ingestion logic from overlay processing to enable the system to easily adapt to new sensor/video types. VESPA's configurable pipeline allows features, i.e., metadata error correction, to be quickly added or removed based on operational needs. Finally, the VESPA's supplemental features, such as web-based administrator's interface, integrated performance profiling, and load balancing can be leveraged by RTO.

FIG. 1 shows an example of a conceptual overlay workflow process 100, according to embodiments. The process 100 can be represented by an initialization thread 105 that decodes and correct for errors in the video and metadata and a rendering thread 130 that creates a virtual 3D model of a scene represented in the video, creates one or more overlays, and renders the one or more overlays over the virtual 3D model. In particular, the initialization thread 105 receives frame source data 110 and metadata from a metadata source 115. The frame source data 110 is processed by a decode operation 120 where video data is decoded and/or decompressed to produce a stream of video frames, and if multiplexed with the metadata, demultiplexed. The metadata is then corrected to compensate for one or more of: missing sensor data, temporal sensor drift, and spatial sensor drift, using a metadata correction operation 125. The metadata correction operation 125 can use the processes described in FIGS. 11 and/or 14. The metadata correction operation 125 produces an optimum sensor pose for a video frame, which is refined for each subsequent video frame in a feed-back operation. The results of the initialization thread 105 is then provided to the rendering thread 130. The projection compute function 135 uses the optimum sensor pose to compute a geometric conversion from a real-world coordinate space, e.g., latitude/longitude that are captured by the camera, to a rendering coordinate space in a virtual 3D model of the earth. The projection compute function 135 also overlays supplemental data, e.g., roads, elevation, text, etc., with the virtual 3D model. The overlaid video is then rendered 140 and the overlaid video is encoded or published at 145.

To support the customization of individual layers and modification of global settings, a layer appearance model can be used to hierarchically apply styles which dictate the rendered appearance of each layer (color, alpha/transparency, line thickness, etc.). Each overlay layer implementation defines a set of configurable appearance parameters which the layer can use to render its markup. Defaults for these parameters can be loaded at system start from external configuration files. Users may then override certain settings in real-time via a framework supplied API. Layers may also choose to inherit certain parameters from their parent layers or from the global appearance model. This inheritance approach is conceptually similar to the cascading style sheets ("CSS") used to specify the appearance of HTML web pages.

A framework called the StyleTree can be used as a means of loading and managing various appearance attributes. The StyleTree framework loads in multiple hierarchical keyhole markup language ("KML") stylesheets and exposes the appearance properties by starting at each leaf node and crawling the hierarchy back towards the root to find a property that has been populated. Thus, more specific settings override more general ones.

In various implementations, a global appearance model can be defined and integrated with the system's layer manager. The global appearance model is a collection of default rendering preferences available to all layers. The global appearance model can be loaded at system start-up by the layer manager and used to initialize the system's StyleTree. The StyleTree can then be provided to each layer as they are created and their datasets loaded. Layers may augment the StyleTree provided by the layer manager with their own appearance settings, use the default settings in the global appearance model, or ignore the StyleTree altogether. Appearance settings added to the system's StyleTree by a layer can be available to that layer and any of its children. Layer appearance settings will not impact any sibling layers (layers that fall outside of the adding layer's hierarchy).

As indicated above, the present system can support multiple end-users (per incoming video stream) where the overlay data flow includes one "source workflow" (defined by the video and metadata sources), and zero or more "rendering workflows" (defined by the source workflow). A source workflow merges video and metadata and then transmits the merged video frames, via, e.g., a TCP connection, to any rendering workflows that subscribe to it. A rendering workflow sets up a connection with its source workflow, produces the overlay images, based on user-configured layers, and publishes them via, e.g., a web socket.

As indicated above, the real-time overlay system can be integrated with VESPA. The overlay workflow can be divided into two components: one for synchronizing video and metadata, and one for rendering overlay elements for end users. One "source" workflow will send synchronized frames to one or more "rendering" workflows, allowing better scaling of the system for multiple users. The present system can support binary serialization of video frames, so that they can be passed between workflows via network sockets, allowing more flexibility in deployment.

There can be two categories of multi-user settings: per-user settings and exclusive settings. Per-user settings allow multiple users to update settings simultaneously or concurrently, while the exclusive settings allow only one user to update them at a time. Two users in different viewing perspectives (front person vs. virtual) can change some exclusive settings concurrently, e.g., sensor and map parameters. Multiple overlay and scene related settings can be selected and grouped into two categories. The first category is per-user settings and can include, for example, occlusion handling, virtual perspective, label size, and transparency, visibility, color for all the overlay layers including, for example, OpenSteetMap, map elevation, labels, placemark, region, image, text, twitter, etc. The second category is exclusive settings, which can include, for example, sensor manipulation, manual registration, expanded context ratio, map provider, map zoom level, map bound scale, street width, and flight simulation. The per-user settings and exclusive settings can be stored in a singleton object. The per-overlay settings for each user can be stored in a dictionary where the layer names are used as the keys. Since only one layer manager and one set of overlays are typically maintained, the setting accesses for different users are handled when there's no entry in the dictionary by the key-value pair being added if default settings are expected at the initial access. Each layer can share some common settings, such as transparency, visibility, and color. These settings can be initialized in the overlay base class and then managed by the user setting class. After that, the overlay specific settings can be either added or updated to the user setting based on its layer name.

The rendering engine can be updated so that multiple overlay rendering calls are launched and each call displays the result to an end user. The user index can be passed into the frame parameter that propagates to the sub draw calls. The overlays can be all initialized with their layer names upon creation. In each draw call of an overlay object, for a given user, its settings are retrieved based on the user index and the layer name. The overlay visibility is checked, and its transparency and color settings are passed into the shader together with other layer specific settings.

A real-time overlay web-based user interface may be employed, according to embodiments. One or more than one layer selection panels allows users to toggle on/off overlay layers and their sub-elements. Options panels can be dynamically built based on the settings exposed by each layer via the options API. Users may customize the rendered appearance of individual layers from the system's web-based UI. An options dialog is available for each layer that contains appearance parameters that may be adjusted. This dialog can be dynamically built at runtime using data retrieved using a RESTful Options API. The Options API enable each layer to define and expose its own set of appearance settings, e.g., line colors and width of rendered streets or font style and sizes of text labels, to the UI. Reusable widgets can be created to provide input mechanisms for each option type, e.g., a color picker for color options, a slider for percent values, and a numeric spinner for numbers. These input widgets can be used to construct the options dialog based on the layer configuration detailed in the Options API. This allows the dialog to automatically adapt to changes in existing layers and the addition of new layers without requiring modifications to the UI.

A layer properties dialog enables users to customize the render appearance of each layer. The dialog is built dynamically when opened using the selected layer's option API.

Controls can be added to the UI to enable users to view an expanded context mode, which can be a feature in the render pipeline. In the expanded context mode, the video is displayed at full resolution, but the output frame size is increased, creating a padded area around the video frame which can be filled with a neutral color. Overlay layers can be applied as normal, but across the expanded frame area such as, streets and other data, which would normally not appear in the frame are displayed providing users additional awareness of elements just outside the sensor's field-of-view.

Users are able to select from different expanded context sizes in the UI, e.g., +25%, +50%, and +100%. These sizes correspond to the height and width of the padding added around the original video frame. When the user selects a new expanded context size, a message is sent from the UI to the server-side render engine activating the feature. The video player is then automatically resized in the browser to adjust for the new video frame size. Users may revert to the original video by selecting the 0% option.

The present overlay system can include an overlay asset manager ("OAM") that is operable to handle overlay assets, loaders, and support reference data. Assets are components that enable new rendering types or compositions of existing assets which may be dynamically deployed at runtime instantly expanding the overlay system's capabilities. Loaders are another form of components that may be added into the system. Loaders are responsible for interacting with external data sources to ingest new formats and standards into the overlay system.

The OAM can be separated into an external stand-alone application running on a map server. The OAM can be operable to maintain internal and custom developed asset plug-in implementations, as well as acquisition and storage of overlay datasets. The OAM application can provide a centralized service that communicates with configured data sources, downloads, and caches needed datasets. Subscribers register themselves with the overlay framework and request an overlay video feed with a particular video stream/data and overlay supplemental datasets. The datasets may be locally cached, stored, or remotely accessible. If not locally cached, the datasets may be stored in the OAM database or retrieved remotely on-demand and then cached locally if possible. The asset is then applied to the subscriber's overlay stream. Datasets with different access frequencies may be stored using different mechanisms. The overlay framework can internally synchronize the video and overlay data streams before passing it onto the overlay processing modules.

As arbitrary overlay datasets need to be stored and processed, normalization schemes for those datasets can be applied before the overlay framework is able to handle them efficiently. The loader plug-ins for each of the datasets can be replaced by normalization plugins that share the same interfaces. The normalization plugins serve as dataset proxies as if the dataset is available through a sequence of similar request API interfaces to a virtual server that handles the data requests and returns the required data with appropriate format in a timely manner and with low footprint on memory/processors resource usages. The arbitrary datasets can be categorized by multiple criteria as follows: a) Static vs. dynamic; b) publicly-available vs. proprietary; c) frequently vs. infrequently accessed; d) real-time accessible vs. offline accessible; and e) preprocessing needed vs. off-the-shelf.

TABLE 1

Sample datasets and their categories

| Sample Dataset | Static vs. dynamic | Public vs. proprietary | Access Frequency | Offline vs. R/T | Preprocessing |
|---|---|---|---|---|---|
| AerialImage | S | Public | Frequent | Real-time | No |
| DEM | S | Public | Frequent | Real-time | No |
| OpenStreetMap | S | Public | Frequent | Real-time | No |
| LiDAR | S | Public | Frequent | Offline | Yes |
| AirspaceSymbology | S | Proprietary | Frequent | Offline | Yes |
| PointsOfInterests | D | Public | Frequent | Real-time | No |
| RouteDirection | D | Public | Infrequent | Real-time | No |
| TrafficCongestion | D | Public | Infrequent | Real-time | No |
| MovingTarget | D | Proprietary | Frequent | Real-time | No |
| Search/Advertisement | S | Public | Infrequent | Real-time | No |

As shown in Table 1, some of the datasets, including Open Street Maps, aerial maps, DEM, and LiDAR, may be static, and thus can be stored locally based on the task profiles or travel paths/destinations. Dynamic datasets may be real-time accessible and their volume is lower compared to the static ones, such as directions, points of interests, traffic congestion patterns, moving target indicators, etc. Preprocessing may be needed for some datasets. For instance, the LiDAR data coming from point cloud formats may need triangulation and polygon reduction for efficient display, 2D textures with alpha channel for the standard airspace symbology may need to be generated first, and the textured DEM data may need to combine multiple aerial maps and elevation data. Offline datasets, such as LiDAR, may need to be downloaded and stored. The real-time accessible datasets can be either stored or cached locally with the OAM or perform real-time data requests when there is sufficient Internet access. Frequently accessed datasets may be preloaded in the system memory or have higher priorities in terms of access and storage. Certain access policies may need to be applied on the proprietary datasets for people with different security levels.

Figure 3:
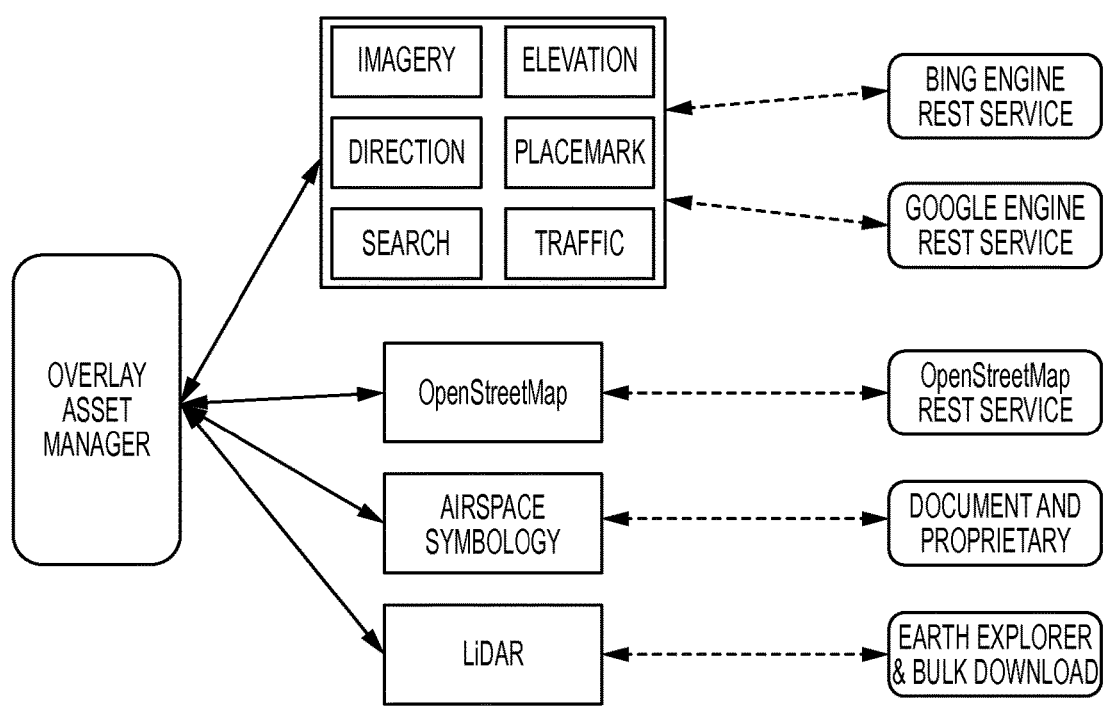
FIG. 3 shows sample datasets and their categories, according to embodiments.

FIG. 3 show sources for some common datasets, according to embodiments. Different sources of publically available information can be integrated into the present system as an overlay layer. The dataset sources can be obtained from services, such as Google, Microsoft's Bing Engine, and OpenStreetMap. Additionally, many of these services provide a RESTful API which may be used to download data on-demand, which can reduce upfront reference data storage requirements. For instance, the aerial imagery, elevation, route, placemark, search, and traffic information can all be retrieved using the Bing REST services (http://dev.virtualearth.net/REST) or Google engine REST services (http://maps.googleapis.com/maps/) with an API key. The map data can also be retrieved using the OpenStreetMap REST API (http://api06.dev.openstreetmap.org/). The Earth Explorer application (http://earthexplorer.usgs.gov/) and the Bulk Download Application (https://lta.cr.usgs.gov/DownloadBulkApplication) can be used to download LiDAR data and other datasets such as Digital Line Graphs, National Atlas, GEOLAM, Landsat, Radar, Vegetation Monitoring, and so on. The LiDAR data is based on the point cloud .LAS format, therefore the LiDAR data needs surface triangulation using a mesh tool such as Adobe Maya before being displayed in the overlay engine. United States airspace symbology can be obtained using the Aeronautical Information Exchange Model (AIXM), an XML schema developed by the FAA and EUROCONTROL. One or more of the above identified data sources can be integrated into the overlay using an open-source library called GMap.NET (http://greatmaps.codeplex.com/). GMap.NET is a library which acts as a proxy to 16 map providers including Bing, Google, Yahoo, OpenStreetMap, ArcGIS, and MapQuest. The library works by launching multiple threads to query image tiles simultaneously from remote severs and store them in a local cache. The data may be cached in memory, SQLite, MySQL or PostgreSQL, depending on the application's needs.

Image tiles can be retrieved using the library's tile-system based RESTful APIs. The number of image tiles and the number of threads are dynamic based on the image center coordinate, the zooming level, and the viewport size.

In order to render the maps in the overlay engine, the elevation data corresponding to the image tiles may need to be obtained. The Bing elevation provider can be added to the asset management core library, where multiple elevation retrieval methods are supported: by boundary, by polyline, and by coordinate list. To reduce the rendering overhead, a single grid can be used to store all the image and elevation tiles, so that the textured DEM overlay can be drawn within a single rendering pass using a single vertex buffer and the dynamic tessellation shader. The process can include the following steps. The grid or the overall area is first manually divided into multiple tiles. For each tile, the image and elevation data are retrieved. The data overlapping across multiple tiles are handled in the asset core. Finally, the maps, vertices and densities are all assembled and passed into a map terrain overlay object for display. To assemble the maps, a bitmap with the grid dimension is first generated using the background color, the image tiles are then copied there using their metadata. Note that the image tiles may not cover the whole grid, but the elevation tiles do due to different data retrieval methods. To assemble the vertices, the range of the latitude and longitude in the grid are calculated, which can be based on the area boundary or the image tiles. The texture coordinates are then mapped to individual grid cells. One or more satellite image tiles may be registered onto one or more tiles of the elevation data. If color is an essential part of this, what is it doing? This needs to be set out In implementations where the asset core library only provides image tiles from the OpenStreetMap ("OSM") server, an OSM API provider can be added to the library to dynamically retrieve raw XML data using the GMap.NET library. A caching mechanism can be used to speed asset loading and conserve bandwidth on future flight passes. The OSM tiles can be cached using a hash code computed using the tile's coordinates and then stored in memory or an SQL database cache. This process can include the following steps. In the OSM loader class, before deserializing the XML stream, a call to the OSM API provider is launched instead to get the data from the remote sever or the local cache. Then the coordinates for each way are collected to the path overlay object and later used to compute the vertex data for display.

Caching of elevation and map data can be accomplished using a SQLite database. To efficiently cache the georeferenced overlay data, a large geographic area centered on the sensor's expected field-of-view is predefined. The area is subdivided into smaller regions with image tile and data from each overlay reference set (elevation, road networks, satellite, etc.) is indexed and stored for each. The number of data tiles for each dataset may vary depending on the nature of the data.

The local caching mechanism for elevation data can be implemented in the asset core library. The SQLite table contains a number of entries such as the tile ID, the elevation bounds, the database ID, and the cache time. A new structure for bounds indexed data tiles and associated comparer class is created. A dictionary-based cache and associated memory cache classes are then built to add or remove the tile data as a byte array.

Besides the memory cache, the SQLite cache class can also be added to store/retrieve data tiles to/from the database where the data retrieval is based on the tile bounds. The cache management classes can be updated to add the elevation tile caching related objects and functionality such as moving the database to a non-roaming user directory.

There can be three modes for data access: server only, server & cache, and cache only. When an elevation tile is requested, memory cache is first checked when allowed. If the data is not available in the memory database, it is then inspected to determine if the data is present. If the data is available and memory cache is used, the data will be cached into memory. Otherwise, a data request will be sent to the remote server.

After an elevation tile is received from the server, a cache task is generated and populated with the tile data, and then placed into the cache task queue. Afterwards, a cache engine thread is launched with the lowest priority if it is not already alive, and caches each tile task in the queue. The elevation tile data can be copied into the entire grid structure in order to use a single rendering pass and single vertex buffer for improving the rendering performance.

For OpenStreetMap, a similar strategy can be used for data processing since it can also be divided into multiple tiles. Its tile size can be larger than those of elevation and map tiles where more details are needed, especially for closer views. When an OSM tile is requested, the OSM tile is first tried to be accessed from the cache. If the data is not available in the cache, the OSM tile is requested from the remote server and then saved to the cache.

Figure 4:
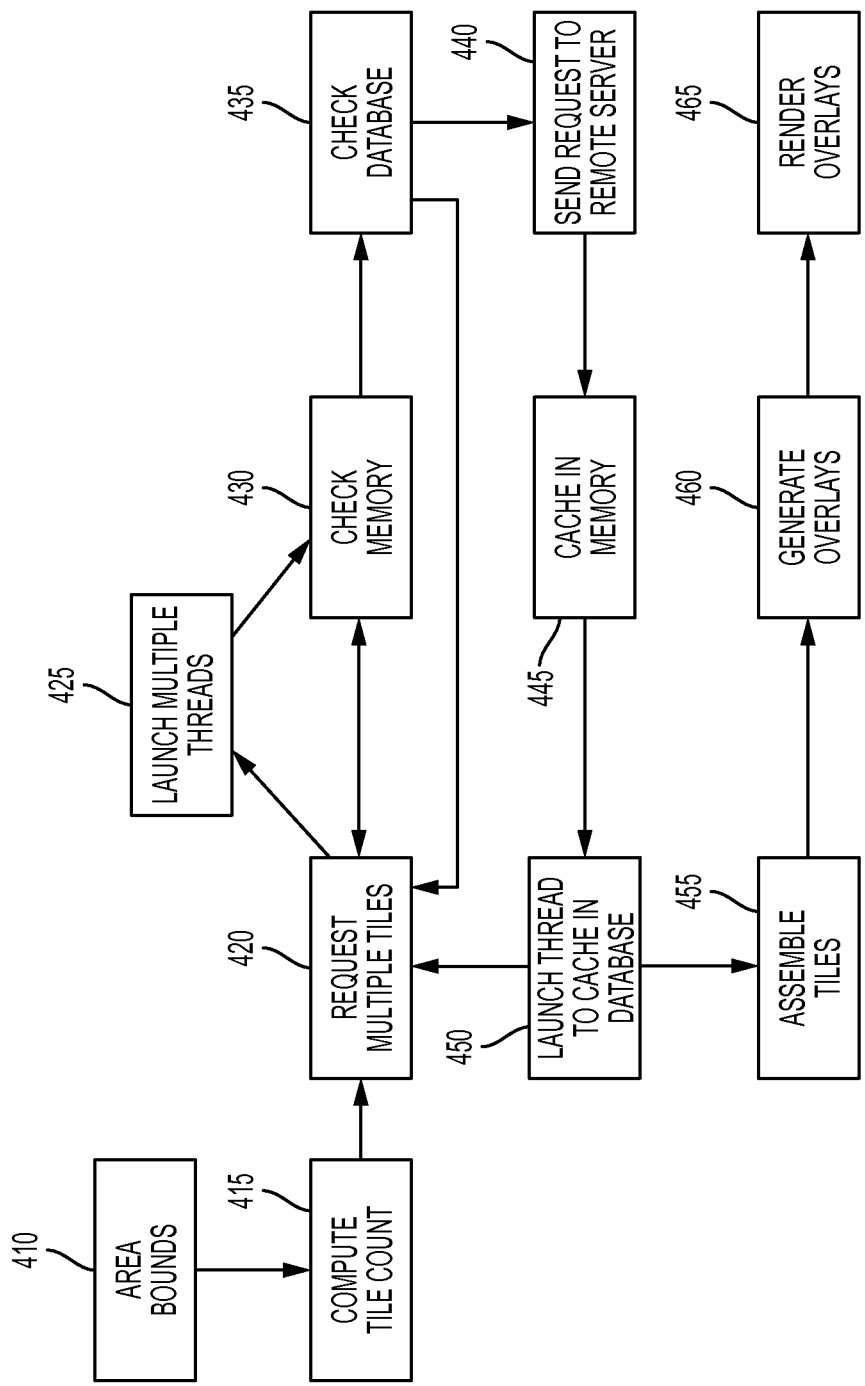
FIG. 4 shows a data access flow and cache mechanism, according to embodiments.

FIG. 4 shows an example of a data access method and cache mechanism, according to embodiments. The process can start by providing area bounds, at 410, to compute tile count at 415. The tile count that is outputted at 415 is requested by a request multiple tiles module 420. The output of 420 is provided to a launch multiple threads module 425. A check memory module 430 is provided with the output from 425 and communicates with a request multiple tiles module 420. The check database module 435 receives the memory check from 430 and provides an output back to the request multiple tiles module 420. The output of the check database module 435 is also provided to a send request to remote server module 440 and is then provided to a cache in memory module 445. Launch thread to cache in database module 450 receives the output of 445 and provide thread to an assemble tiles module 455. Overlays are generated at 460 from the tiles that are assembled in 455 and the overlays that are generated in 460 are then rendered in 465.

The following issues can be addressed when fusing or registering elevation, OpenSteetMap and map tiles together. In the map assembly, the map grid size is set to match the area bounds. Specifically, the latitude and longitude for the left bottom and right top corners are converted to the pixel XY coordinates based on the rules of the Bing tile system. The number of tiles is calculated based on the zooming level and the bounds. Each map tile is 256*256 in dimension and assembled into the grid according to its metadata and dimension. Since the map tiles requested are usually larger than the area bounds, the pixels that fall beyond the grid area can be discarded.

In the elevation assembly, the number of elevation tiles can be determined by the level of terrain detail and the area bounds. Each tile can be placed into the entire grid. Based on the bounds, the latitude, longitude, and elevation can be obtained for each cell and converted to the Cartesian coordinate system. An elevation offset may be applied to match the elevation level of OpenStreetMap.

In the OpenStreetMap assembly, the number of OpenStreetMap tiles can be determined by the minimum spacing and the area bounds. Unlike map and elevation overlay, multiple overlays can be generated with one for each tile considering the vertex buffer size limit to store the texts and roads and the overheads of assembling the tiles.

In some embodiments, a fusion of map, elevation, and OpenStreetMap tiles may be provided. Standard airspace symbology, such as controlled airspace symbology, restricted airspace boundaries, FAA centers, and major air corridors with altitude limits, can be integrated with the present system. A map of visual flight rules ("VFR") and instrument flight rules ("IFR") that already contains many of those datasets can be rendered. The map can then be blended into the video frame and other overlays based on the desired transparency. An API provided from the site http://vfrmap.com/ can be used to retrieve a variety of maps including hybrid VFR, sectionals, world VFR, and low/high-altitude IFR. The zoom levels in this case are typically 10-12 for VFR maps and 9 or 10 for IFR maps. Therefore, each tile can cover a much larger area than that of map/elevation tiles. A VFRMapProvider class can be implemented in the asset core library and used in a way similar to other map access. Multiple threads may be launched to retrieve different tile sets and the tiles will be stored in the memory and database for future access.

The overlay asset management can handle a variety of datasets: street/satellite/misc maps, elevation, placemark, search, route, traffic, OpenStreetMap, standard airspace symbology, LiDAR, 3D models such as UAV or those converted from Google 3D warehouse, visual flight map tiles, instrument flight rules map tiles, etc. Many of these datasets are available in real-time from remote servers and cached locally. Datasets like LiDAR and 3D models need to be pre-fetched and accessed through local databases.

Figure 5:
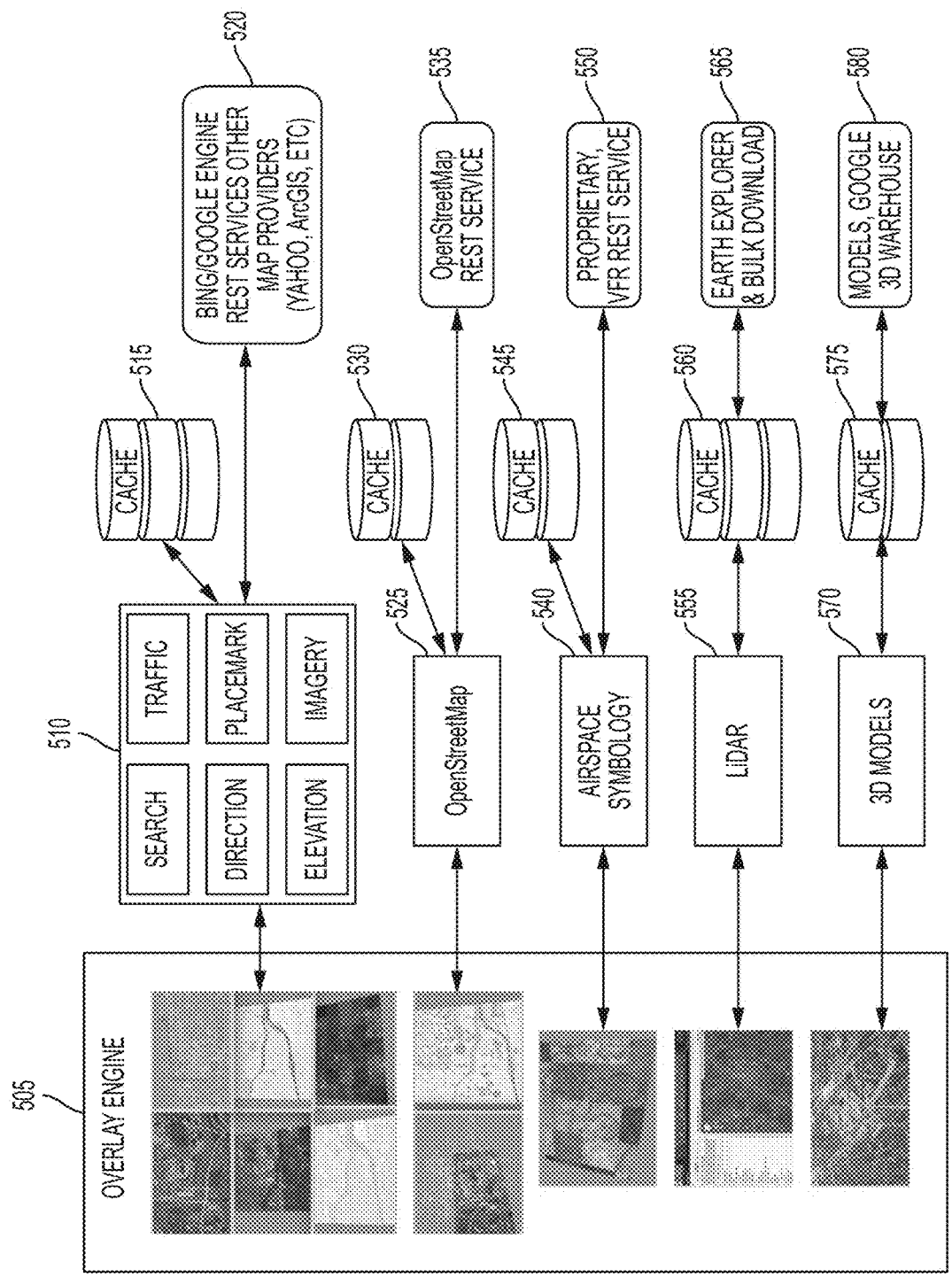
FIG. 5 shows overlay asset management, according to embodiments.

FIG. 5 shows an example of an overlay asset management system, according to embodiments. The overlay engine 505 can communicate with proprietary map providers to obtain data 510 including search, traffic, direction, placemark, elevation, and imagery data, which can be stored in a cache 515, through a REST service 520. The overlay engine 505 can communicate with open source map providers to obtain open source map and related data 525, which can be stored in a cache 530, through a REST service 535. The overlay engine 505 can communicate with airspace symbology providers to obtain airspace symbology data 540, which can be stored in a cache 545, through a REST service 550. The overlay engine 505 can communicate with LIDAR providers to obtain LIDAR data 555, which can be stored in a cache 560, through a REST service 565. The overlay engine 505 can communicate with 3D model providers to obtain 3D model data 570, which can be stored in a cache 575, through a REST service 580.

In some aspects, a social media overlay layer can also be implemented, which integrates with social media providers, such as Twitter, to display real-time, public, geo-tagged social media data, e.g., tweets, as text bubbles in the video stream. For example, Twitter offers a free RESTful API which enables developers to query for and receive streaming tweets based on a collection of query parameters, which include a geographic region, user IDs, and keywords. Applications submit their query parameters via an HTTP request to the Twitter service. The Twitter service will keep the connection open indefinitely and push tweets to the caller that match the query parameters as they are posted by users.

The Twitter overlay layer implementation can integrate with Twitter using Tweetinvi (https://tweetinvi.codeplex.com/), an open-source C# library that wraps the Twitter API for developer's convenience. The layer, when enabled, uses the geo-bounds of the video to construct the query for the Twitter service and establish the Tweet stream. The query bounds submitted to the Twitter API are padded slightly to allow for video movement.

Tweets can be displayed on the video overlay for a short period of time after they are received from the Twitter service. The tweet geo-location is converted to screen coordinates and a text bubble is created based on the length of the text and position on the screen. Non-geo-tagged tweets may not be included in the data stream. A command stopping the data stream can be sent to the Twitter server if the user turns the layer off. This is done to conserve network bandwidth and avoid needlessly processing tweet data.

In some cases, it is not possible to load all the reference datasets beforehand. There are many challenges with the seamless tiles update on the fly. This issue can be addressed with the following approaches. To maximize the cache hit ratio, the map center can be aligned with a grid of cells distributed evenly across the earth globe surface and the dimensions for the elevation/OSMs tiles are fixed. The bounding boxes of map tiles are calculated based on the projection from the sensor to the scene corners and a scale value. Depending on the bounds, multiple fixed-size tiles are retrieved. As the virtual perspective covers a larger area, high-resolution tiles could result in significant latency. Besides, the map center and dimension can be different from the first person perspective. Therefore, the map elevation classes and the loader can be modified to include two instances for each view.

Figure 6:
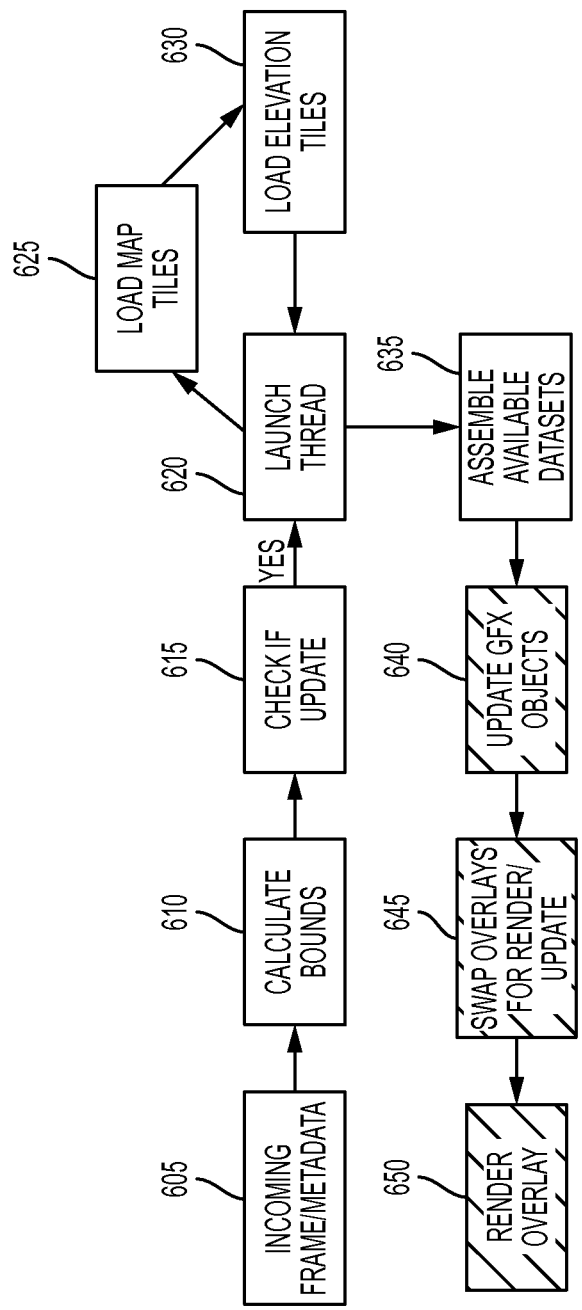
FIG. 6 shows an example real-time tiles update method, according to embodiments.

FIG. 6 shows an example of a real-time map and elevation tiles update method, according to embodiments, which can be performed in parallel with the initialization thread 105 of FIG. 1. For each incoming new frame (or metadata) 605, the new viewing bounds are compared against the one where the dataset and overlay is updated. For example, as each new frame is received, a determination is made whether additional map and elevation tiles are available to be rendered based, at least in part, on a direction of travel of the UAV using, at least in part, the optimal sensor pose information at calculate bounds 610. If the overlap is below a threshold, there is no need to regenerate the overlay data. Otherwise, a thread will be launched to update the scene at 615. To minimize the perceived transition time during the data update, a "double-buffering" scheme can be applied. For each type of data tile that needs update on the fly, two overlay objects can be created at a time, with one for rendering and the other for update. After one overlay object completes the update, it will be swapped for rendering and the other one is marked for the future update. At 620, a thread is launched and map tiles are loaded at 625 and elevation tiles are loaded at 630. At 635, the available datasets are assembled from the map tiles at 625 and elevation tiles at 630. At 640, graphics effect objects ("gfx") are updated and overlays are swapped for the update at 645 and then are rendered at 650.

To mitigate blocking of the main thread in a multithreading process and allow the application to run smoothly even when data is not available, the map elevation classes and the OpenStreetMap loaders and overlays can be parallelized across multiple threads. Map tiles can be retrieved first followed by the elevation tiles. The process is then blocked as the data is assembled and made available for the rendering components. When the overlay object gets updated by the data loading thread, using a mutual exclusion operation or mutex for thread safety would block the main thread and incur latency. Instead, variables can be used to indicate when the overlay data was ready to process and the related graphics objects ready to be reinitialized. The checks and graphics object updates are performed inside the drawing call so as not to block the main thread due to the exclusive lock of the graphics context. Overlay rendering is skipped if the reference data is not yet ready. The data is retrieved based on the map center, dimension and zooming levels or elevation tiles count.

The OpenStreetMap tile loading follows a similar strategy. A thread is launched to retrieve the OSM data in XML format. Then, the overlay is built based on the specifications of nodes and ways. After that, the graphics objects are reinitialized in the drawing call.

Figure 7:
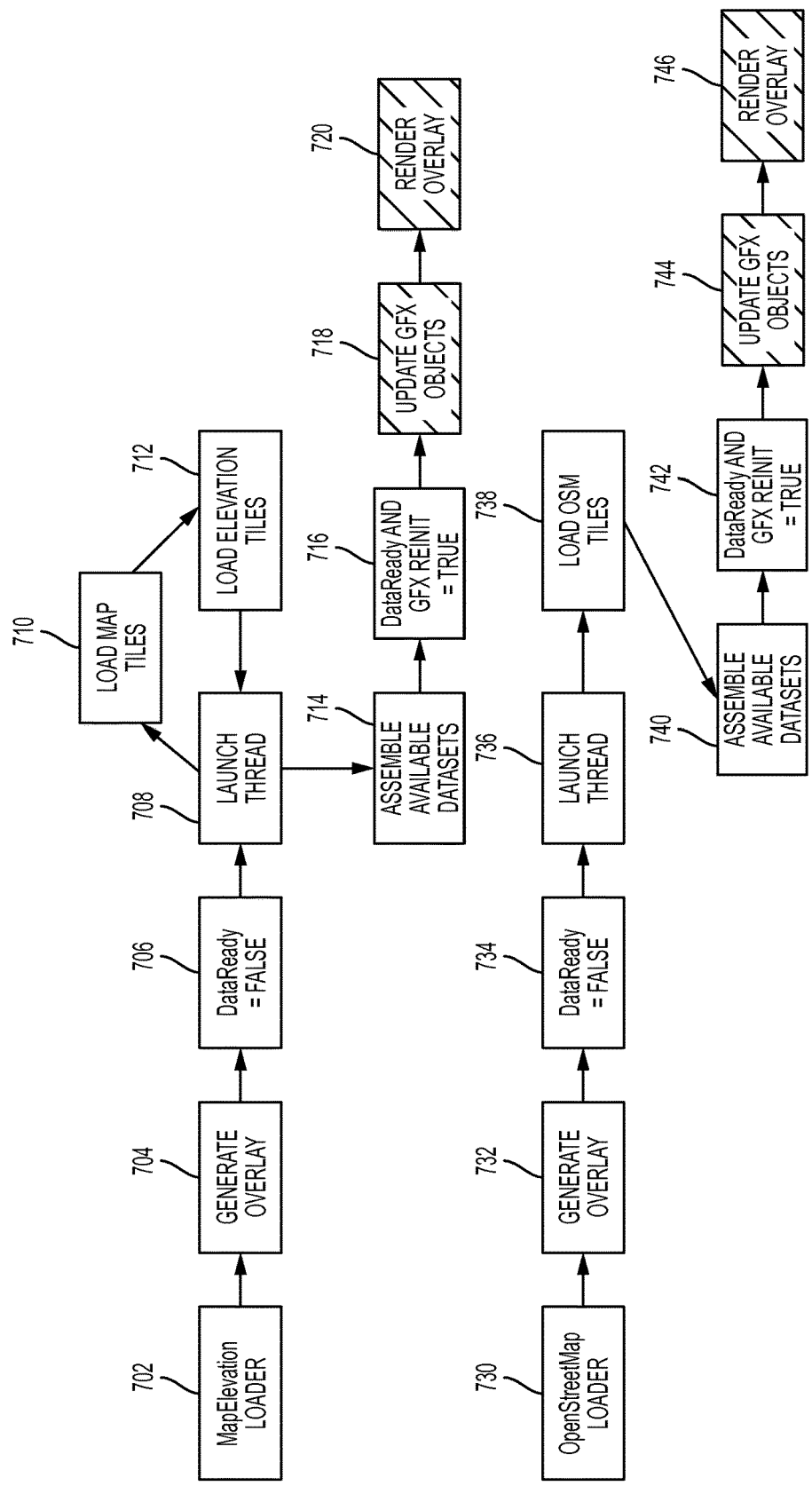
FIG. 7 shows an example method for asynchronous tiles handling, according to embodiments.

FIG. 7 shows an example of an asynchronous tile handling loading work flow process and dataset loading, according to embodiments. A map elevation parameter is provided by a MapElevation loader at 702 to generate an overlay at 704. At 706, DataReady is set to False and at 708, a thread is launched. Map tiles are loaded at 710 and elevation tiles are loaded at 712 and provided back to the thread at 708. At 714, the available datasets are assembled from the map tiles at 710 and elevation tiles at 712. At 716, DataReady and Gfx Reinit are set to True and the gfx objects are updated at 718 and overlays are rendered at 720.

For the OpenStreetMap tile loading, an OpenStreetMap parameter is provided by a OpenStreetMap loader at 730 to generate an overlay at 732. At 734, DataReady is set to False and at 736, a thread is launched. OSM tiles are loaded at 738 and are assembled at 740. At 742, DataReady and Gfx Reinit are set to True and the gfx objects are updated at 744 and overlays are rendered at 746.

To simulate video streams covering arbitrary places, the system can render a DEM dataset with corresponding aerial image texture attached, automate the flight mode, and capture the frame buffer image and telemetry data using the sensor pose information. Textured DEM data rendering is desirable since the aerial imagery can increase situational awareness due, at least in part, to rich details and visual information of the surroundings as opposed to the vectorized OpenStreetMap data. Using the Bing's Map REST API, an aerial image of certain size based or identified using a center point and zooming level or geo-coordinate bounds can be obtained. Additional metadata can be obtained via web requests to calculate information not available with the image retrieval. The corresponding elevation data can then be obtained based on the latitude and longitude coordinate, and the geo-coordinates transformed to Cartesian coordinates for rendering. The texture coordinates of the aerial image can be calculated based on the Bing tile system specification and the map size. Another rendering pass can be added to the dynamic tessellation class and shader so that the texture data can be used to compute the final pixel color instead of the normal/color data.

There are limitations with this dataset retrieval method including that the single tile dimensions and the map sizes are constrained: either to 30×30 or 800×800. As result, the terrain details or features may be lost when displaying a large area using the coarse grid. This issue can be addressed by displaying multiple smaller tiles instead of single larger tiles to provide sufficient terrain details. First, a terrain boundary can be specified. Aerial imagery and elevation data can then be retrieved for each tile within the boundary and the vertex data. Aerial maps and density data can then be assembled into a larger grid.

The present system can include support for WebM, (https://en.wikipedia.org/wiki/WebM), a royalty-free video file format supported by the HTML5 video tag. The format serves as a container for VP8/VP9 video compression and has native support in Firefox, Opera, and Chrome. Each frame can be published from the overlay engine to the client browser using web sockets or WebM, which can reduce the bandwidth used and allow the client to use standard video controls.

In some aspects, elevation data can be used to render a 3D map, project image corners for the video overlay, and estimate/optimize sensor poses. Since the DEM data coming from the Bing engine requires an API key to access while Google API does not, a Google elevation provider can be added to the AssetCore library also to allow for more robustness for the elevation data retrieval. The Google elevation RESTful service returns one or multiple data instances based on the specifications of locations or a path. In order to obtain the elevation data based on the given latitude/longitude bounds, the area was divided into multiple paths along the latitude direction, then retrieve the elevation data for each path, and post process for the invalid or empty data. Finally the data for all the paths gets assembled into the elevation grid. After that, the elevation data is written to a memory stream and cached to the local database to be reused for later retrievals.

In some aspects, an overlay unit framework stack can be used in the present system and can include an overlay engine that performs asset management and processing functions and frame handling functions, an overlay SDK that handles overlay primitives and sensor interfaces, a rendering framework that functions to render primitives and provides utilities support, a DirectX (Slim Microsoft DirectX ("DX") or SlimDX) component, a future APIs component, a plugins (asset and loaders) component that obtains data from the overlay SDK and a datasets component and provides data to the overlay engine. SlimDX is a managed .NET wrapper for the DirectX libraries, and thus allows GPU accelerated 3D rendering from managed code. SlimDX supports DirectX 11, which enables many new features and supports newer graphics hardware.

Graphics objects such as overlay drawables, (roads, regions, place marks, compass, etc), text, images, and LIDAR models can be drawn using the fixed function pipeline or can be rendered with programmable shaders, which allow easy and flexible integration of dynamic visual effects on a per-object basis. The inclusion of tessellation in the DirectX pipeline increases at runtime the polygon counts for low detail models. This can be used in dynamic terrain sampling to improve the rendering/processing efficiency.

DirectX 11 also supports General-purpose Graphics Processing Unit ("GPGPU") operations via compute shaders, which may be used to accelerate computer vision, image processing, and video compression algorithms. Read-write unordered access views support efficient order-independent blending and image processing. Many other features may be utilized, including multithreaded rendering, instancing support, texture arrays, new shader instructions, etc.

For DirectX1.1 operation, technique/shader files are added for the different categories of visual effects supported and interfaces and classes to support shader-based rendering are added, which includes vertex buffer manipulation and shader wrappers. Legacy drawing routines can be replaced for each graphics object with vertex buffer and shader-based routines. A modified version of the text sprite library supports text and image rendering and interfaces are added to support compute shaders.

Proper occlusion modeling within the graphical overlays can give the user a better sense of depth and understanding of the various video elements. The occlusion represents how transparent or not transparent an object is and the degree of an occlusion can be represented by an alpha value that can range between 0 and 1, inclusive, where an alpha value of 0 means that the object is totally transparent and an alpha value of 1 means that the object is solid or opaque. 3D LIDAR models are utilized to capture the scene depth information from a sensor viewpoint. For video overlay rendering, depth testing can be disabled, but when rendering the LIDAR model overlays, depth testing can be used. The world/camera positions and coordinates for the overlay objects and LIDAR models are different, and there are distance gaps between them; simply enabling depth testing for LIDAR is not sufficient.

The present system can support multiple rendering passes. A rendering pass can be added to the LIDAR model effect, which captures the depth buffer with a pass-through pixel shader. This pass can be used when video overlay mode is on, where the color buffer comes from the video frame texture. When the LIDAR model overlay mode is enabled, the original rendering pass is applied instead to capture both the color and the depth buffers. The color and depth buffers are then passed to the overlay effect as 2D textures. The occlusion alpha value is also added to the constant buffer to support different transparency levels in the "X-Ray" mode between the overlays and the background video frames or LIDAR models. Another occlusion rendering pass can be added to the overlay effect. The screen position is calculated in this pass to linearly sample the color texture and point sample the depth texture. The depth value for the overlay object is calculated and compared against the LIDAR model depth value from the current viewpoint. Then the alpha blending is applied to the foreground and background layers to get the final pixel value.

The rendering can be based on multi-sample anti-aliasing. As such, the depth stencil shader resource view should be unbound from the output merger before accessing the buffer data and rebound afterwards. The drawing order should be changed so that the LIDAR models are rendered first, with or without video frame rendering afterwards. The depth gaps should be evaluated and applied between the overlays and the background scene. The text effect should also apply changes similar to the other overlay objects.

A method of detecting occluded overlay elements using 3D color and depth buffers can include the following steps. Logic can be added to render elements detected by this method differently than non-occluded overlay elements. When the occlusion mode is enabled, the alpha blending for the overlay objects with the video frame will be turned off to avoid the visual artifacts of double blending. This is done in the overlay pixel shaders. The text occlusion handling is also implemented. Text rendering mode is differentiated from the sprite texture rendering mode. The color and depth buffers and the occlusion alpha value are added to the library and passed to the text sprite shaders. Screen position is calculated with the geometry and pixel shaders. The occlusion alpha blending is handled in the similar way as other overlays.

The depth stencil buffer is accessed through the texture defined in the graphics context initialization stage, rather than being captured after each LiDAR data rendering, since overlay rendering does not need depth testing. In some embodiments, when occlusion alpha is 1, the occlusion mode is fully on, when it is between 0 and 1, the x-ray mode is enabled, and when the occlusion alpha is 0, the occlusion mode is turned off and the original alpha blending method is applied instead.

A silhouette (darkened interior and exterior borders) can be added to each roadway, path, and region. The silhouette can be rendered in the same color family as the element, but in a darker shade or opaqueness. This feature makes identifying occluded elements in the video easier, yet does not draw attention away from other surface elements. The silhouette rendering can be applied to the road elements regardless of whether or not it is being occluded.

Compute shader-related interfaces, routines, and debugging utilities can be added into the framework to allow the framework to easily handle multiple compute shaders, a variety of buffers, such as constant, staging and unordered buffers, textures with different dimensions, shader resource views, unordered access views, and simplifies data transfer to the GPU.

The resampling shader can be optimized to skip unnecessary computations and minimize local memory usage. Down-sampling can be performed only to pixels falling within the zooming window. Down-sample calculations are returned immediately for opaque pixels. Semi-transparent pixels may require additional down-sampling over the entire background, which is then is blended with the previous layer. No additional local memory may be needed to store the colors for each layer with this approach. In some embodiments, one or more zooming and/or down sampling windows may be applied on top of a down sampled background layer. Each window can be identified with a different edge color and has different transparency alpha. Their zooming levels can be in decreasing order. For example, a white edge zooming window can have the same zooming level as the one over the background. Their blending is ordered as well, with edge window nearest and the edge window farthest depicted differently, i.e., by color or other means.

The GPU download of zooming window parameters typically incurs a very small overhead per frame. This overhead is further reduced when blending is disabled. Tile generation and assembly incur the largest overhead in the process. Disabling multi-sample, anti-aliasing improves the rendering speed, reduces GPU memory usage, and removes the copies from multi-sample texture to non multi-sample one. Since for each tile the computing routines would be same before each tile drawing, the system can be restricted to perform the computing only once instead of on a per-tile basis.

Spatial partitioning can be used to minimize latency for any component requiring retrieval or analysis of geographic elements. For example, quad trees, which is a tree data structure in which each internal node has exactly four children, can be used for visualization based on even partition and uneven partition corresponding to different partition criteria, respectively, according to embodiments. For the distributed system, both processing and network transmission can be minimized while not sacrificing the user experience or task efficiency. The partitioning approach can be generalized to address the following considerations. The areas with high complexity or salient features may incur a higher level of activities and attract higher attentions. Based on the tasks being performed, the areas of interest could be automatically identified for fine-grain processing. User preferences, habits or characteristics can be used to define the areas of interest and reduce the processing/transmission cost. There are cases that no heterogeneous partition is needed or the system processes each partition evenly, such as for tile generation.

To facilitate data retrieval and analysis, data structures can be used for efficient indexing, which includes 2D spatial data structure such as a quad tree, user interaction trajectories and predictions, task/user profile and salient feature sets. Each asset layer would manage a spatial partition tree for that particular layer.

The camera's view frustum parameters can be passed to the data structures and can be used to filter out the elements of interests for further processing. The generation of tiles for high resolution imagery also benefits from this optimization. Additionally, the hidden elements can be identified based on the alpha transparency and zooming window locations/sizes to skip further processing.

The asset layer contains heterogeneous datasets which can be treated differently when applying spatial partitioning. For terrain related datasets such as DEM or LiDAR data, GPU-based spatial partitioning or dynamic terrain sampling can be applied to boost render performance. Dynamic terrain sampling adds geometric detail onto material surfaces using DirectX 11 Tessellation to introduce new vertices onto the underlying geometry and displace those vertices according to accompanying position, normal, and density maps. This approach has multiple advantages compared to traditional per-pixel displacement techniques, such as bump mapping, parallax mapping, and parallax occlusion mapping. Because the surface bumpiness is modeled using real geometry, the quality usually exceeds per-pixel displacement techniques which are prone to under-sampling issues. It also allows proper interactions with other Z-tested geometry. Unlike per-pixel "ray casting" techniques, edges produced from dynamic tessellation are not subject to aliasing issues and benefit from multisampling anti-aliasing. Dynamic tessellation renders real silhouettes by displacing actual vertices so the geometry produced is not confined to the pixels contained within the original triangle. Dynamic tessellation produces higher-quality results than traditional per-pixel displacement techniques and does so at a significantly lower performance cost on modern DX11 graphic hardware due to a typical reduction in processing tasks.

Figure 8:
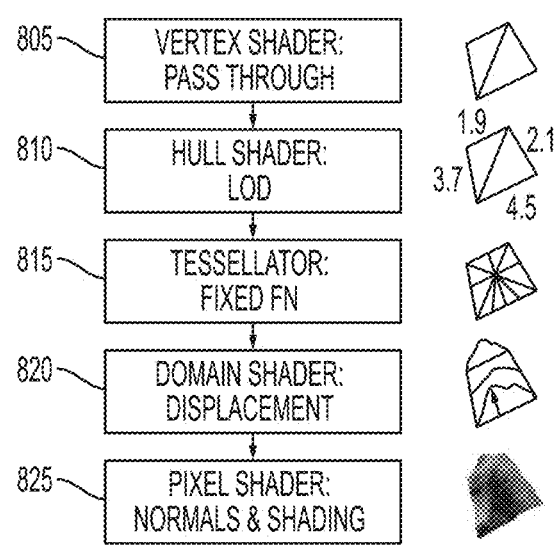
FIG. 8 shows an example dynamic terrain tessellation with a shader pipeline, according to embodiments.
Figure 9A:
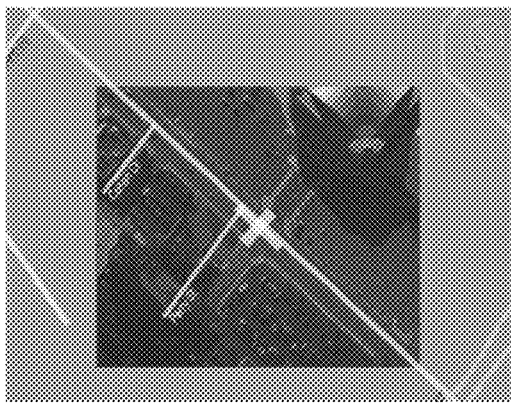
FIGS. 9A-9D show manual correction of sensor metadata as applied with a manual sensor transform correction (translation and/or rotation), according to embodiments. Manual sensor metadata correction improves the video overlay registration.
Figure 9B:
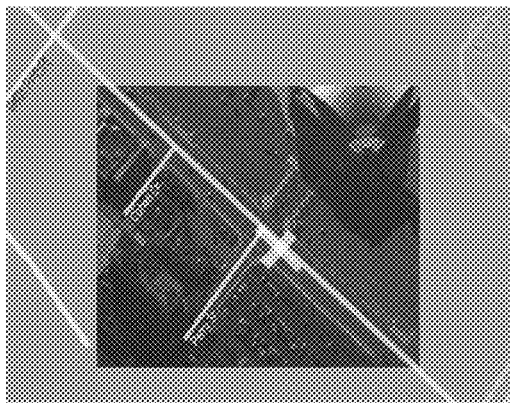
Figure 9C:
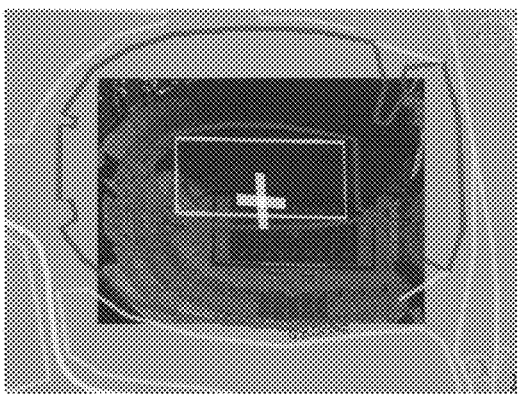
Figure 9D:
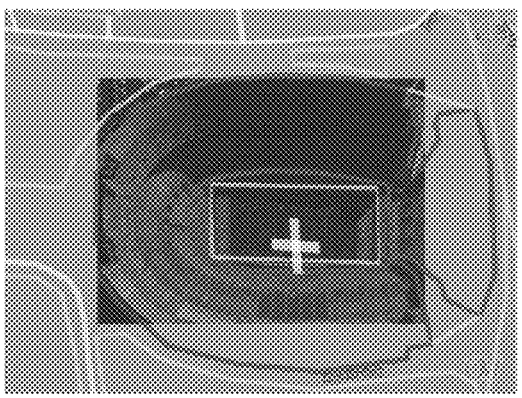

FIG. 8 shows how the technique maps onto the stages of the shader pipeline. Shader input primitives are triangle patches. Two triangles are generated for each data cell. The triangle vertex data defines 3D coordinates of the coarse mesh with the texture coordinates used to sample the detailed maps for the terrain data. At 805, a vertex shader is passed through since the input is already 3D vertex coordinates in the world space thus there is no need to displace the patch corners. At 810, a hull shader computes the level of detail (LOD) data and assigns tessellation factors to the patch edges and center. It discards the vertices outside of viewing frustum and those out of the DEM data boundary, calculates the tessellation factors based on viewing distance and the detail maps, making it a very complex part of the system. At 815, a fixed-function tessellator subdivides the patch into triangles, using the tessellation factors output by the hull shader. At 820, a domain shader samples the displacement maps based on tessellated texture coordinates and generates the detailed data including vertex position and normal. It then applies the world-view-projection matrix to transform the vertex into the homogeneous space. At 825, a pixel shader shades the surface with the directional lighting technique and the tessellated position, normal and color data from the domain shader.

DEM data handling for virtual terrain models (e.g. video games) is typically modeled as an entirely flat surface accompanied by a height map and vertex data that define only the 2D extents of a patch. Cartesian coordinates of DEM data, however, are generated from the latitude, longitude and elevation data associated with a fixed number of columns with each column having different number of rows. This discrepancy is addressed using the following approaches.

For patch generation, DEM data dimension bounds are evenly divided into quads as the coarse mesh based on the cell size factor. The 3D Cartesian coordinate and the row and column of the texture coordinate of the detailed terrain maps are passed into the vertex data and two triangles are then generated for each quad.

For terrain maps, the DEM data (positions, normals, and colors) are stored in the GPU's structured buffers so that it may be sampled by the domain shader based on the texture coordinates.

To tessellate the terrain based on complexity, salient features or user/task profile, density maps are built on CPU and downloaded to GPU structure buffers. To realize detailed tessellation for each coarse cell, the density value is computed as the weighted sum of the horizontal, vertical, and diagonal variations. For instance, the variations are based on the angles between two normalized opposite direction vectors, right versus left, or top right vs. bottom left direction vectors. For each triangle patch, the maximum densities are calculated along the three edges based on the density values for each texel on edge. The values are limited to be a minimum of 1 to avoid the triangle culling and the inside tessellation factor is calculated as the maximum of the three density values. The tessellation factors are retrieved from the hull shader given the patch ID.

For irregular layout, different columns may have different rows of data and usually the row count is small when close to the column bounds. The patches with invalid coordinates are discarded in the hull shader by setting the tessellation factors zero.

For terrain map sampling, the detailed terrain data can be stored in structure buffers. To get the correct data, the buffer index needs to be calculated based on the clamped integer values of the interpolated texture coordinates in the domain shader.

For frustum culling, since the primitives out of viewing frustum do not need to be processed or drawn, the frustum planes can be calculated from the view and projection matrices and passed them to the hull shader. Then for each vertex of a triangle patch, the distances from the left/right/top/bottom clip planes are calculated. The triangle is visible only when it passed all four plane test.

The tessellation factors can be based on the viewing distance. The midpoint of edges and the patch center are used to compute the distance from the sensor position and the tessellation results.

According to some embodiments an expanded context rendering mode may be used, an overlay for a configurable area around the actual video frame is rendered to provide additional situational awareness, according to embodiments. In the expanded context mode, the video is displayed at full resolution, but the overall frame size is increased, creating a padded area around the video frame which can be filled with a neutral color. Overlay layers can be applied as normal, but across the expanded frame area—streets and other data which would normally not appear in the frame are displayed. This serves to give the viewer additional context about the video. For example, a UAV operator could see a no-fly zone or landmark before the camera field of view reached it, and an analyst might gain additional insight into the surveilled area by better understanding the street network around it. To implement this feature, the graphics context size of the rendering pipeline is expanded, as are the projection matrix and the target/screen projections. This feature essentially breaks the assumption that the final rendered dimensions are the same as the input video. Therefore, adjustments to the sprite and text rendering and the placemark texture and font transformations are made so that everything appears in the proper scale.

According to some embodiments, the render engine can be modified to enable a virtual camera to be defined at arbitrary locations and viewing angles to the video and reference map tiles. The sensor model and geo-located reference data are already projected onto the world model for standard and expanded context modes, it is a straightforward process to project and render the data from the perspective of the virtual camera.

According to some embodiments, during real-time missions, it may be useful to switch between map types and/or providers on the fly. A change in map providers may also necessitate a zooming level change. For instance, the satellite maps from Bing or Google Engine can zoom up to level 23, while the standard airspace symbology maps such as VFR and IFR maps are limited to a zoom level of 10, 11 or 12.

To reduce the time spent waiting for the map switch, an additional thread per switch can be launched. The data fields related to bounds can be recalculated and the map provider and zooming level are then updated. In this case, the tile loading queue and the dictionary list storing tiles for all zooming levels are cleared. The loading tasks and variables are regenerated and multiple threads are woken up or launched to access new data tiles. Since the VFR and IFR maps share the same map provider, the memory caching mechanism is disabled when switching among these map types so that the obsolete data for one map type will not be used for another.

To improve the visual effects, especially from a virtual perspective, a 3D drone model (MQ-9 predator), the environment map or the skybox, and the earth globe to the virtual world can be added to the present system. In order to support a greater number of 3D model formats, a third party library Open Asset Import Library (Assimp) (http://assimp.sourceforge.net/) can be integrated in the OverlaySDK, which imports various well-known 3D model formats in a uniform manner and exports 3D files therefore is suitable as a general-purpose 3D model converter. The 3D formats can include: Collada, Blender 3D, 3ds Max, Wavefront Object, Industry Foundation Classes, XGL, Stanford Polygon Library, AutoCAD DXF, LightWave, Stereolithography, DirectX X, AC3D, and many motion capture, graphics engine, game file, and other file formats.

For the UAV display, an open-source MQ-9 predator model can be used and the Assimp Viewer can be used to export it to one with a better format. A mesh asset loader can then be added and generated the vertex data by recursively visiting the model tree nodes. The vertex data contains position, normal and texture coordinates. A DX11Mesh object that contains the effect and vertex buffer object is then generated. To render the textured 3D model, a UAVOverlay class and an effect file is added. In the vertex shader, the light position is the position of the virtual sensor, the ambient and diffuse components of illumination are computed and modulated into the model texel in the pixel shader. The UAV position and orientation are calculated based on the sensor model parameters.

A skybox loader, overlay, and associated effect file can also be added into the OverlaySDK to render the environment. A cube map is loaded and set as the shader resource. A sphere vertex and index buffers are generated and passed to the shader. In the vertex shader, the local vertex position is used to sample the cube map pixel. An earth globe with uniform color is added with vertices calculated based on the Cartesian coordinates converted from geo coordinates for each subdivision.

In order to accurately overlay geo-registered information onto the video, the system models the scene and camera parameters in both space and time in order to properly place the virtual camera. Ideally, metadata from the UAV platform and attached sensor would provide the exact location, angle, and optical parameters of the sensor for every frame of video. In reality, these measurements suffer from inaccuracy, drift and temporal shifts that can cause significant errors in the final video overlay. In some systems, a loss of global positioning system ("GPS") lock can result in video sequences with no usable metadata at all.

Metadata error estimation and automated correction functions can be performed using a VESPA module that integrates most of the 2D feature detection and matching algorithms from OpenCV libraries such as Scale Invariant Feature Transform ("SIFT"), Speeded Up Robust Features ("SURF"), ORB, STAR, Maximally Stable Extremal Regions ("MSER"), Features from Accelerated Segment Test ("FAST"), Good Features to Track ("GFTT"), etc. Some parallelizable algorithms are implemented with CUDA/GPGPU calls, including SURF, ORB and FAST. A RANdom Sample Consensus ("RANSAC") based motion estimation component with feature detection based on SURF or other variant algorithms was also integrated. The application also contained a Kalman filter implementation in order to smooth out sensor parameter updates over time.

While the actual processing on the GPU is very efficient, the image data for each frame needs to be transferred from CPU memory to GPU memory; in a server or desktop system, this takes place over the PCI Express ("PCIe") bus. This data transfer may incur significant costs due to contention for the same PCIe bus lanes with other traffic such as graphics rendering to the display. A multiple-GPU system, with one GPU card reserved for rendering and a second for compute may alleviate this issue, as would allocating a dedicated system for compute.

These stand-alone registration modules can be modified to function within the system framework and restructured for scalability and efficiency. An interface for feature detection and matching interface, and two algorithm classes (CPU algorithm and CPU-GPU algorithm) were added. Each algorithm belongs to one of the two categories of feature detectors. A registration class manages the feature detection and matching algorithm, the updates of homography matrices in either continuous running or frame seeking mode, and the algorithm validation. A VESPA actor wrapping the geo-registration module is used. Interactions with other modules include sensor parameter input from frame source actor and sensor pose output to the overlay engine actor.

FIGS. 9A-9D show manual correction of sensor metadata may be applied with a relatively stable transform error (translation and/or rotation), according to embodiments. A variable error can reduce the effectiveness of this feature. A mechanism for manually correcting misaligned video can be included in the render engine. The engine can be modified to accept user supplied translation and rotation parameters that are applied to the original sensor model prior to geo-registration. The system may fail to automatically correct the sensor metadata if there is insufficient or low-quality reference data for geographic region or the error in the raw metadata is too large be overcome. In this scenario, users may manually adjust the translation and/or rotation parameters until registration is corrected.

According to some embodiments, 2D registration can be based on a GPU SURF algorithm. A feature-matching UI can be integrated in order to help validate the frame-by-frame 2D registration step. SURF or SIFT-based feature detection and matching perform robustly with the sample videos, and with existing set of UAV video samples. The 2D registration also works in the case of missing frames.

Experiments have shown that using SURF and related feature extraction provides very good matches between frames of the same source video, but poor matching between video frames and reference imagery. The algorithms are too dependent on lighting and surface textures, thus the same physical features photographed by different sensors at different times of day or year simply do not match. Therefore other means of computing features, such as the Gabor filter, which is an edge detection algorithm, can be used for which fast GPU implementations exist.

In one example, a Multicore Parallel Bundle Adjustment ("PBA") tool (http://grail.cs.washington.edu/projects/mcba/) using the sample data and the RTO dataset was used for testing. The sensor poses and 3D points were optimized after running the algorithm on multiple CPU/GPU cores. To facilitate the data validation process, a tool was created to visualize multiple sensor poses, 2D projections and 3D points from different perspectives. While the sensor positions and 3D point positions are specified in the sample data, there is some work involved in the computation of the 3D positions of the 2D projections and the sensor XYZ directions.

In the sensor model used in the PBA tool, the matrix for the camera motion is calculated as a combination of the inverse/transpose form of the rotation matrix and the camera center based on the rotation/translation data. The 2D projection at the focal length is then transformed to 3D world position based on the camera motion matrix. The direction from the sensor to the 2D projection is then obtained and the projection is drawn at a fixed length from the sensor. The 2D projections from the sensor can be displayed in the shape of cones. For example, in the sample data, there were 26 sensors, 5215 3D points with each point corresponding to 2 to 18 2D projections from multiple sensors.

The testing was expanded to ten sensor datasets. Since the algorithm requires data based on the overlapping regions of multiple frames, after the frame by frame registration or motion estimation, the matching 2D projections and 3D points based on DEM intersection in the overlapping area of two or more video frames is recorded. The matches between multiple 2D projections and single 3D points are identified with a distance threshold. At first, the data is not rendered correctly as 2D projections do not intersect the path from the sensor to the 3D points. This is due to the difference between the RTO framework's sensor model and that of the bundle adjustment tool. The rendering can be corrected by performing 2D projections to 3D points using the RTO sensor model first to get the 3D points, and then update the 2D projections based on the bundle adjustment sensor model given the 3D points. The sensor directions are also based on the bundle adjustment sensor model.

Figure 10A:
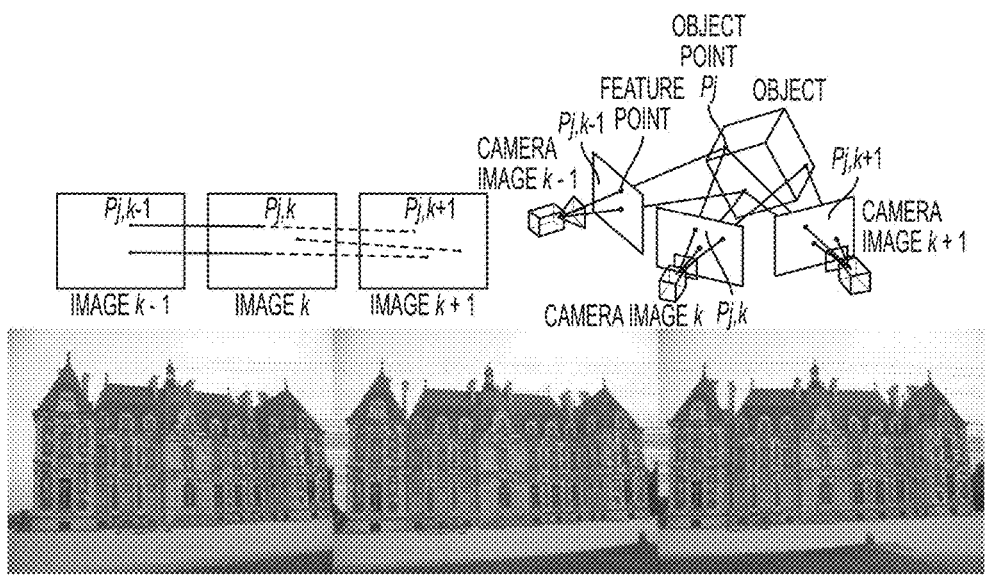
FIGS. 10A-10C show multi-view geometry, where
Figure 10B:
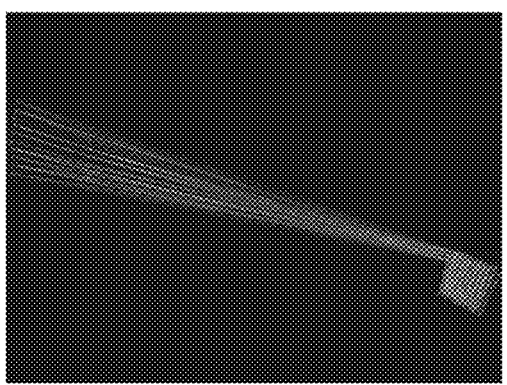
Figure 10C:
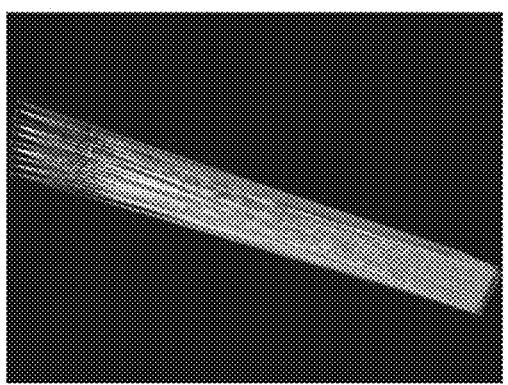

FIGS. 10A-10C show multi-view geometry, where FIG. 10A shows an open multiple view geometry, FIG. 10B shows projections from each sensor to 3 3D points, and FIG. 10C shows projections from each sensor to all the 3D points, according to embodiments. Since the 3D points may come from registration with a reference image and multiple frame triangulation, the open Multiple View Geometry (OpenMVG) library (http://imagine.enpc.fr/~moulonp/openMVG/) can be used. The OpenMVG library (FIG. 10A) is designed to provide easy access to accurate solvers and tools for projective multiple view geometry problems. Its main contributions are the multivew and robust_estimation libraries which provide solvers for affine, homographic, fundamental and essential matrices, pose estimation/camera resection based on 6 pt, 4 pt with intrinsic EPnP, and 3 pt with intrinsic P3P, and robust model estimation with Max-Consensus, Ransac, LMeds and AC-Ransac methods.

The triangulation test of multiple views is updated to read in the sensor poses and 3D points collected from the RTO framework. 2D projections are calculated based on the sensor model and 3D points. After applying the iterative triangulation algorithm, the new 3D points are saved with the original sensor poses and calculated 2D projections. The data output is then visualized with the same tool developed for visualization of the bundle adjustment dataset as described above. FIG. 32B shows the projections from each sensor to 3 3D points, and FIG. 10C shows the projections from each sensor to each of the 3D points.

Metadata error correction can be performed by first registering video frames with the reference map. Given the initial metadata, video frames are roughly registered with the reference map and map patches are found, then anchor frames with robust registration are found, and the rest of frames are registered using these anchor frames and frame by frame registration. The image patch is first transformed into the video frame coordinate frame and the perspective geometry with rigidity constraint is estimated. Lagrange optimization is then used to minimize the reconstruction error and get the final homography H.

Figure 11:
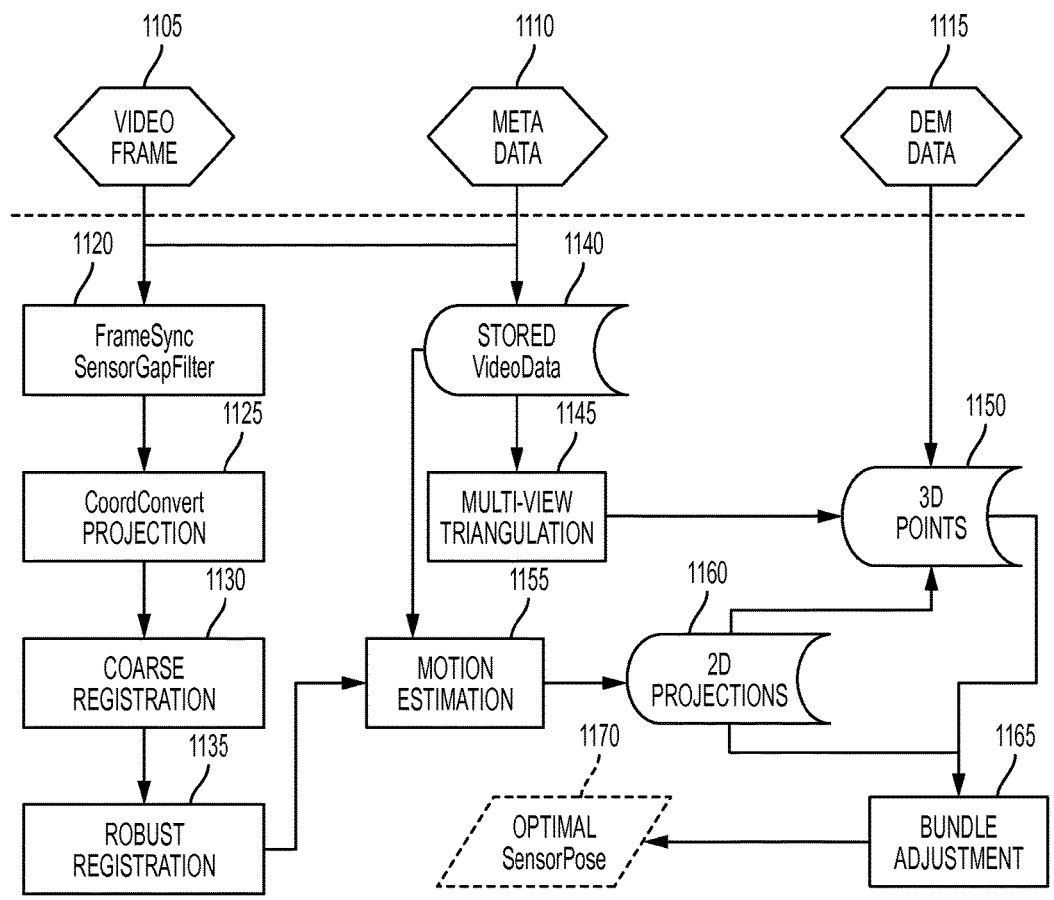
FIG. 11 shows an example of a metadata error correction framework, according to embodiments.

FIG. 11 shows an example of a metadata error correction process that can be used in metadata error correction operation 125 of FIG. 1, according to embodiments. As previously discussed, metadata error may be due to missing sensor data, spatial drift in the sensor data, and/or temporal drift in the sensor data. The metadata error correction is used to an updated sensor pose for each video frame, which is then refined for each successive video frame in a feed-back manner to produce an optimum sensor pose, which is location of the camera on the UAV in the real world. The sensor pose is then used to create a 3D model of the scene that is captured by the camera, render the scene, and overlay the video with supplemental data, such as from the DEM. This allows the viewer of the UI to have some measure of assurance that what is being captured by the camera of the UAV is actually what is being viewed by the camera and that the DEM data has been accurately overlaid of the video.

Turning to FIG. 11, a video frame from video frame process 1105 and corresponding sensor metadata from sensor metadata process 1110 are streamed locally and stored for later usage at Stored VideoData 1140 and DEM data is cached or pulled from online reference data sources at DEM Data store 1115. The video frame and the sensor metadata are initially synchronized at FrameSyncSensorGapFilter 1120 and pixels in the video frame are linked to a 3D virtual model of the earth that is created at CoordConvert Projection 1125 to produce a coordinate system conversion between the real world and the virtual model. Next, coarse and robust geo-registration algorithms are applied at Coarse Registration 1130 to find anchor frames, discussed further below, and Robust Registration 1135 between the anchor frame and the current video frame, also discussed further below, to determine the motion of pixels. Motion estimation between video frames using first the coarse and then the robust registration is determined at Motion Estimation 1155. The world (earth) coordinates of the video frame can be determined at Multi-View Triangulation library 1145. 3D points are computed from the DEM data store 1115 and the 2D images from the video frame are projected onto the DEM data at 2D projections 1160. Bundle adjustment module ("PBA") at 1165 minimizes the reprojection error between the image locations of observed and predicted image points and determines the optimal sensor poses at 1170, which is further refined as subsequent video frames and sensor metadata are obtained and processed. The previous and current video frame data may alternatively be sent to the OpenMVG module to compute the 3D points.

Figure 12:
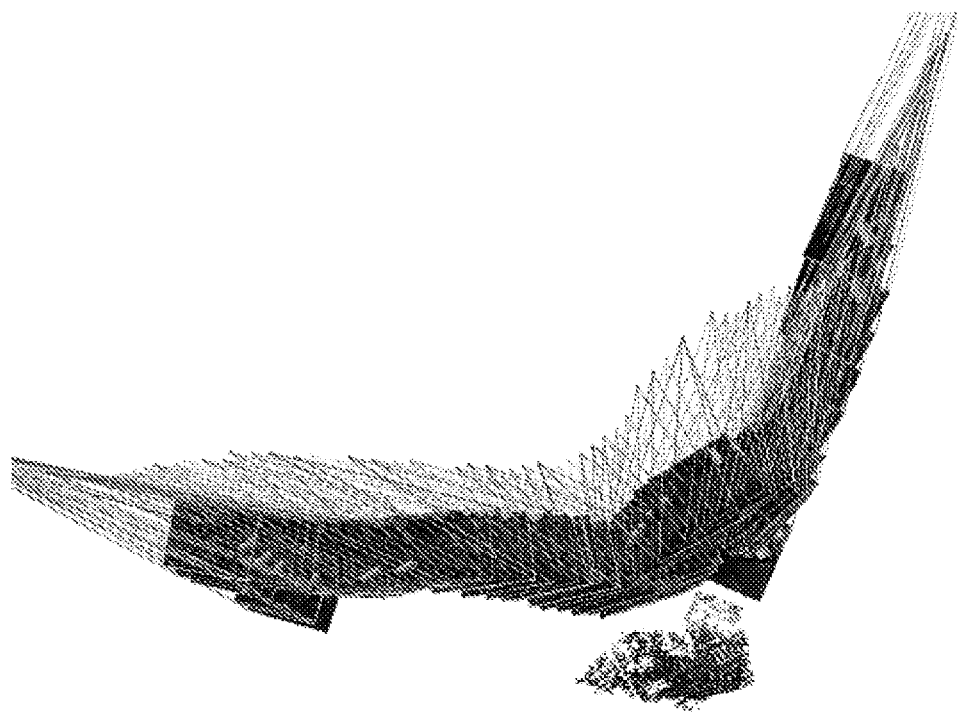
FIG. 12 shows an example of a pair-wise registration-based sensor pose estimation, according to embodiments.

FIG. 12 shows an example of a pair-wise registration-based sensor pose estimation, according to embodiments. The 3D points that correspond to 2D projections can be based on triangulation with multi-frame registration. However, purely registration-based sensor pose estimation is not accurate or deterministic. The VisualSFM tool (http://home-s.cs.washington.edu/~ccwu/vsfm/) was used to evaluate the accuracy in this scenario. Even with the pair-wise registrations across 80+ frames, which took 5 minutes to compute, the results, as shown in FIG. 12, are not acceptable. Therefore, the 3D positions should come from a reliable source, such as Digital Elevation Map (DEM) or LiDAR data, when possible. In the cases where this reference data is not available or the registration with the reference data is not reliable, triangulation can be used in the motion estimation stage, and combined with the estimated sensor pose from the sensor metadata or the Kalman filter.

The new inexact Newton type Bundle Adjustment algorithm, which is a preconditioned conjugate gradient solver, can be hardware accelerated with the use of multicore CPU up to 10× speed-up or multicore GPUs up to 30× speed increase. Overcoming the memory and bandwidth limitations of GPUs leads to more space and runtime efficient algorithms (http://grail.cs.washington.edu/projects/mcba/).

Sensor pose refinement can be performed given a collection of the initial sensor poses, the 3D points and their corresponding image projections and sensor indices. It usually adopts bundle adjustment methods that refine a visual reconstruction to produce jointly optimal 3D structure and viewing parameter (camera pose/calibration) estimates. Classically, bundle adjustment computations are formulated as nonlinear least squares problems. The cost function is assumed to be quadratic in the feature re-projection errors, and robustness is provided by explicit outlier screening.

The 2D geo-registration module can be integrated into the Overlay Engine using the following steps. First, the reference map and its bounding area are first obtained using multiple high-resolution tiles around the sensor location through the AssetCore library and a map provider. Second, the telemetry data may update once every several frames. Telemetry data is typically provided intermittently compared with sensor data. For example, for around 10 frames, one metadata can be provided. For a video frame that comes with the telemetry data, the map to frame registration is performed. The map area based on the sensor metadata is extracted from the reference image and then used to register with the video frame. Third, if the registration error is below a threshold, the frame corners and internal points are corrected using the homography matrix. The anchor frame is then selected based on a rigorous registration error check and used for frame to frame registration. Fourth, if the registration is not successful or no telemetry data is available for the current frame, frame by frame registration will be performed based on the previous calculated anchor frame and the current video image. Then corners are then corrected and the anchor frame can be optionally selected to be used in later frame-frame registrations. Fifth, when both registrations fail, an extrapolation scheme may be applied to estimate the sensor pose.

Video Overlay Registration in the 3D view: The registration module operates within the overlay framework by modifying the overlay engine as follows.

The sensor model is built by first processing telemetry data, which includes the following. The video frames and the telemetry data are extracted and geo-registration processes. Next, a metadata source actor reads in the telemetry data in JSON format that contains the frame number, platform geo-coordinates and orientation, the horizontal and vertical field of view, the sensor relative and absolute orientation, the corners, and the frame width and height. The sensor position is calculated using the geo-coordinate to Earth-Centered, Earth-Fixed ("ECEF") transformation. The projection matrix is then calculated based on the horizontal and vertical field of views.

The next step in building the sensor model is to determine ground projection matrices. In order to perform corner projections, screen coordinates to ground projections, DEM projections, and to calculate the viewing matrix for 3D rendering, during initialization, the ground projection matrices are determined to account for the ellipsoid shape of the earth, and compute the orientation transformation matrices based on the platform geo-coordinate and sensor absolute orientation.

The following step in building the sensor model is to determine corner and screen coordinate to ground projections. For corner projections, four corner directions are created based on the horizontal and vertical field of views, the orientation transformation matrices and the earth shape matrix. The closest intersection points on the earth are determined using the quadratic formula. The ECEF is performed to geo coordinate transformation to get the latitude and longitude of the corners. For screen coordinate to ground projections, the direction to ground is first calculated based on the screen coordinate and the frame dimension. A similar projection routine is then performed.

The last step in building the sensor model is to determine the viewing matrix, which is determined based on the sensor position, the look-at position, and the upward vector. The viewing direction is first calculated and then the direction to the center point of the right bound is calculated. The upward vector is a cross product of the two vectors. After that, manual translation and/or orientation are applied if they are present. Then the viewing matrix is generated with right hand look at function. The view matrix and projection matrix can also be used to compute the screen coordinate corresponding to a 3D position.

Since the video corners are corrected after the 2D geo-registration process, the video no longer appears in a rectangular shape with fixed dimension and orientation. To visualize the corrected video and corners, the video projection and target/corners overlay is turned on as if in the virtual perspective mode. Since the corrected corners assume a zero altitude, the map elevation overlay is generated with zero altitude as well.

The video projection can be drawn as two triangles given the four corner positions and the video frame or by tessellating the quad with 4×4=16 cells, calculating the position and the texture coordinate for each cell vertex, and downloading the vertex data to GPU for rendering. When there are limited 3D overlay points, the 2D geo-registration may be sufficient in terms of accuracy and speed.

Since the UAV sensor model does not include an intrinsic matrix, the focal length is calculated based on the image dimension and the field-of-view. While the horizontal and vertical focal lengths are different, the vertical focal length is used since the bundle adjustment library assumes a single focal length. This would require a change during the image projection computation. For a given screen coordinate, the angle between its direction and the target direction is first computed, and then the image projection is calculated based on the single focal length and the computed angle.

After the 2D registration is successfully performed, a homography matrix is obtained, with which an array of points in the image can be specified and projected onto a reference map and with which can be used to correct the geo-coordinates of the video corners and internal cells. Then 3D point values are calculated based on the latitude, longitude, and elevation of the corrected points by performing DEM projections to get the 3D locations corresponding to the 2D points. The sensor metadata is then corrected using the multi-core bundle adjustment library. For the DEM projections, the elevation data can be used from the AssetCore library. The direction to ground is calculated given each set of screen coordinates. Then, a determination is made whether there is an intersection for each cell in the elevation grid. If so, the intersection position is returned. A hierarchical approach can be used to speed up the intersection checking, where a coarse grid, 2×2 for instance, is first checked, then the intersecting cell is checked, and the process repeats until the bottom tessellation is reached. During the application execution, the current sensor model is stored together with the 2D projection and 3D points. When the sensor model count is beyond a threshold, all related records associated with that sensor are removed.

Since the sensor updates once every few frames, some of the projection data may relate to sensors with the same parameters.

Figure 13:
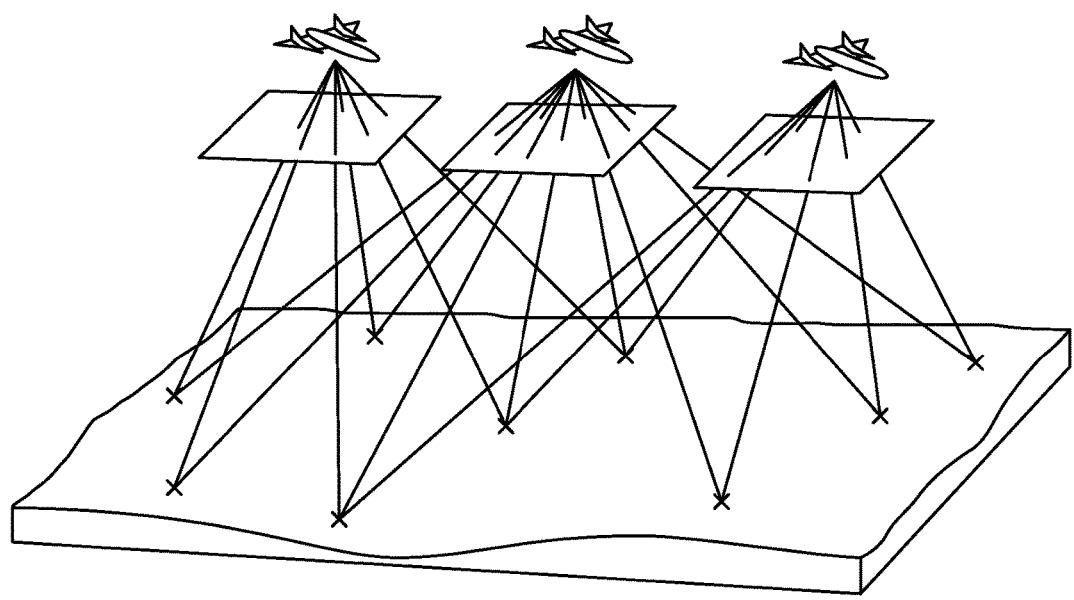
FIG. 13 shows an example of a bundle adjustment (multi-view projection), according to embodiments.

FIG. 13 shows an example of a bundle adjustment (multi-view projection), according to embodiments. A commonly used approach for data collection is based on the multi-view image matching results. When feature key points are robustly registered across multiple frames, the 2D projection and 3D point values are calculated. If the 3D point is very close to an existing one, the 2D projections will be appended to the collection associated with the existing 3D point. Special handling is needed to ensure the previous anchor frame falls within the data history threshold and the obsolete datasets are discarded in a way first in first out. This approach is more complex compared to the second one since the potential datasets can be much larger from the frame by frame registration, but the results could be more accurate.

If the sensor extrinsic parameters need only to be computed including the position and orientation, given the camera intrinsic parameters, 2D image points, and 3D points, one approach is to formulate it as a PnP problem. For parallel bundle adjustment, one commonly used approach is bundle adjustment formulated as nonlinear least squares problems. The Levenberg-Marquardt (LM) algorithm is the most popular solver, which operates by solving a series of regularized linear approximations to the original nonlinear problem. In addition, better performance can be achieved by combining an Inexact Step LM algorithm and Preconditioned Conjugate Gradients. A multicore bundle adjustment library PBA (http://grail.cs.washington.edu/projects/mcba/) can be used to speed up the solver with multicore CPU and GPU hardware accelerations. The system components can be directly interfaced with the library after each 2D geo-registration to modify the current sensor pose based on the optimized results. Then the sensor pose, the corrected corners, and the overlay frame parameters are sent to the render engine for visualizing the graphical overlays and the video frame in 3D. In the ideal case, there is a sensor update for each frame and the video frame projections are aligned at the center of the expanded view, and the orientation is relatively fixed as a rectangular shape. The sensor pose is updated per frame and the video frames are aligned at the center. There are some other well-developed packages such as Bundler (http://www.cs.cornell.edu/~snavely/bundler/#S2) which is based on a modified version of the Sparce Bundle Adjustment (http://users.ics.forth.gr/~lourakis/sba/), and the Ceres Solver (http://ceres-solver.org/) library, a feature rich, mature and performant library for modeling and solving large, complicated optimization problems and used in production at Google since 2010.

GPU-based 2D geo-registration is significantly faster than the CPU-based registration. However, the results were not as robust and can be addressed as follows. Given the matched results, the re-projection error can be calculated as the normalized distance between the corrected values and re-projected values. The distortion error can then be estimated as the sum of the angle distortion error and the length distortion error. The registration error is a weighted sum of the re-projection error and distortion error. Different error thresholds can be specified for map-frame and frame-frame registrations. If the registration error is beyond a threshold, the CPU-based registration approach can be used. For CPU-based geo-registration, a simplified version of error checking is performed, since this mode is more robust. A similar process repeats for the following incoming video frames.

Table 2 shows CPU and hybrid GPU-CPU based geo-registration performance comparison for 50 frames where a 2.44× speedup was achieved.

| Round | CPU Geo-registration (ms) | GPU-CPU Geo-registration (ms) | Speedup |
| --- | --- | --- | --- |
| 1 | 27941 | 11454 | 2.44X |
| 2 | 27488 | 11392 | |
| 3 | 27885 | 11294 | |
| Average | 27771 | 11380 | |

Figure 14:
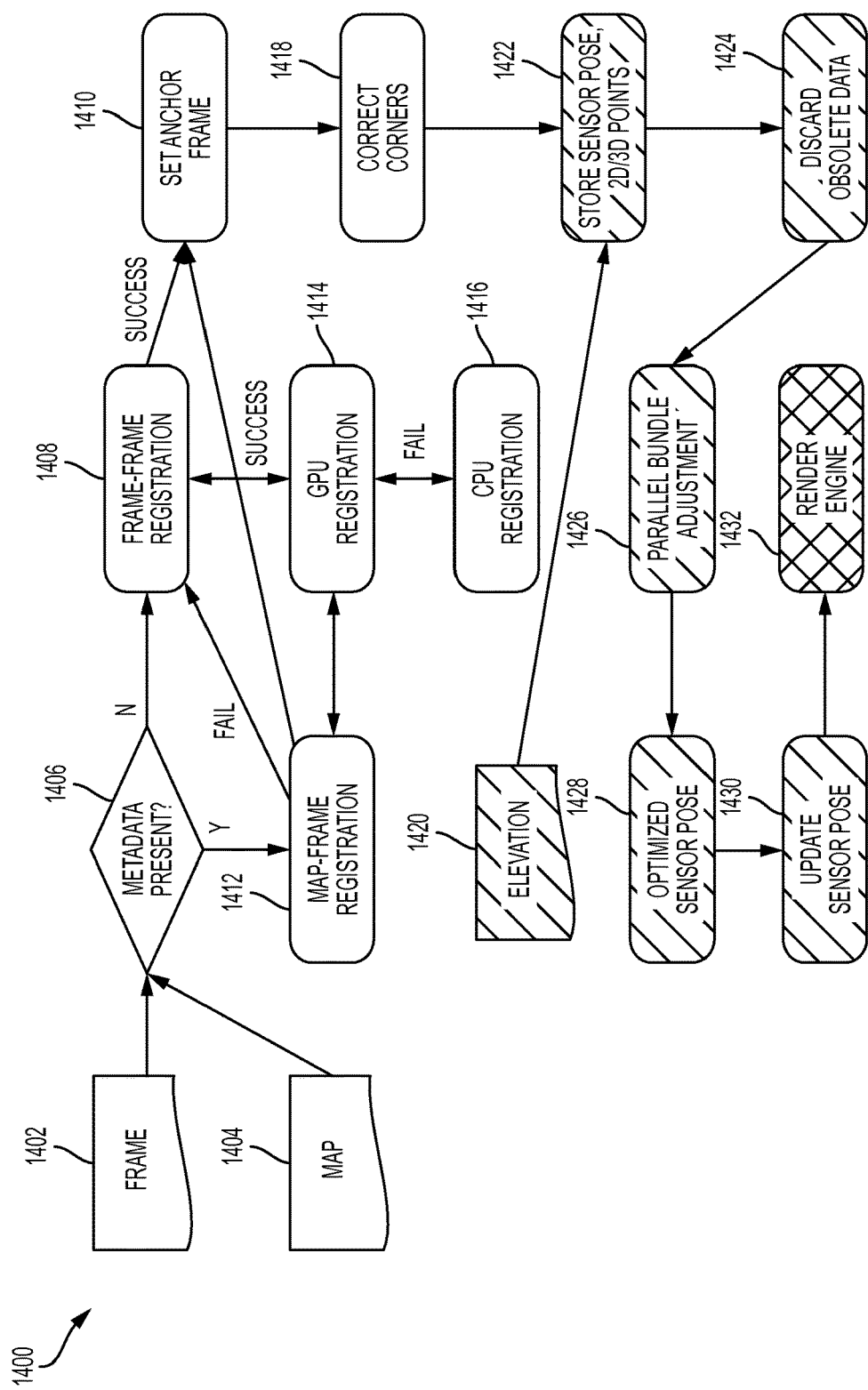
FIG. 14 shows an example of a geo-registration and sensor metadata error correction workflow (e.g., a sensor pose optimization method), according to embodiments.

FIG. 14 shows another example of a sensor pose optimization method 1400 that be used instead of or in conjunction with the process of FIG. 11 in the sensor metadata correction 125 of FIG. 1, according to embodiments. The method for the sensor metadata error correction 1400 uses elevation data in combination with video frame and map data to estimate and refine the camera pose for each successive video frame and generally include the following steps. Accompanying the incoming video frames at 1402, the map and elevation data are retrieved asynchronously, at 1404 and 1420, respectively, and used for map to frame registration and 3D point calculation. If the sensor metadata is present as determined at 1406, a map-to-frame registration is performed at 1412; otherwise, a frame-to-frame registration is performed at 1408. Inside the two 2D registration modes, the GPU-based registration is first launched at 1414, if the registration error is beyond a threshold, the CPU-based registration is launched at 1416. If the map-to-frame registration failed as determined at 1412, the frame-by-frame registration is then performed at 1408. The anchor frame is a reference frame from which motion between video frames is determined and is set when either one succeeds at 1410. If the geo-registration succeeds, the corners and internal points are corrected for video rendering in the 3D view at 1418. If not, the original or extrapolated corners are used. For each successful registration, the sensor model, 2D image projection, and 3D points are calculated and stored at 1422. The obsolete sensor and projection datasets are discarded to improve the real-time performance at 1424. The datasets are then input to the bundle adjustment library at 1426 and the optimized datasets are obtained at 1428. The sensor pose is then updated with optimized one at 1430. The updated sensor pose, the corrected corners, and the video frame parameters are then sent to the render engine for visualization at 1432.

As discussed above, sensor metadata error correction is usually need to overcome challenges due to temporal shift in metadata; spatial inaccuracy in metadata; and when the scene is not 2D but in 3D. In one example approach, the method can begin with an extraction of an anchor frame, which is a frame from in the sequence of video images from the aerial vehicle that is used as a reference from which corrections in the sensor metadata can be made. Given the initial sensor metadata, video frames may be roughly registered and the corresponding map patches may be found. Anchor frames which are first or robustly registered between video frames and a map may be obtained by minimizing re-projection error with the exemplary constraint as shown below. The re-projection error can occur when a determine is made as to where camera should be facing and then reproject the camera view back onto the virtual scene and you get error there your overlay is not going to line up with the original camera geometry.

$$\min(H) R_{g(v,m,H)} = \min(H) \Sigma_{j=1}^{n} (|p_j^v - H p_j^m| + |p_j^m - H^- p_j^v|)/n \quad (1)$$

subject to H to be close to rigid body geometry, and v is a frame of input image, m is cropped map imagery, $R_g$ is reconstruction error of feature points, j (j=1, . . . , n, where n is the number of corresponding points). Lagrange optimization may be applied to minimize the reconstruction error to get the final 2-D homography.

For example, the initial sensor metadata a projection that camera is expected to have is obtained. One more features of the video image from the camera of the aerial vehicle is extracted and a set of feature points from those one or more features are created and matched against corresponding map data obtained, for example, from satellite imagery, to find possible matching pairs of points. As one example of feature points, feature points corresponding to a street corner in the video image at located and matched against map data showing the street interaction that the camera is expected to be capturing base, at least in part, on the sensor metadata. Because of not all matches will be correct, Lagrange optimization can be used to minimize that error across those pairs. The homography or geographic transformation is used to match the frame that is being analyzed to the map data, which can provide information regarding what transformations can be performed to correct the camera position. The goal in the optimization is to find the best possible homography given the matches that are correct between the video image and the map data.

Other frames may be geographically registered or geo-registered with the reference map sequentially using anchor frames and frame by frame registration using the equation (1). 3D registration can be used to exploit 3D scene data. The 3D DEM may be used for more accurate 3D registration. The 2D corresponding points may be projected to 3D scene. From the feature points in 3D, a projection matrix may be estimated and used to update the camera parameters, such as roll, pitch, yaw, zoom, focal length, etc. The camera parameters can be refined by minimizing (non-linear) reprojection error using the Levenberg-Marquardt minimization or other non-linear optimization approaches.

Figures 15A, 15B:
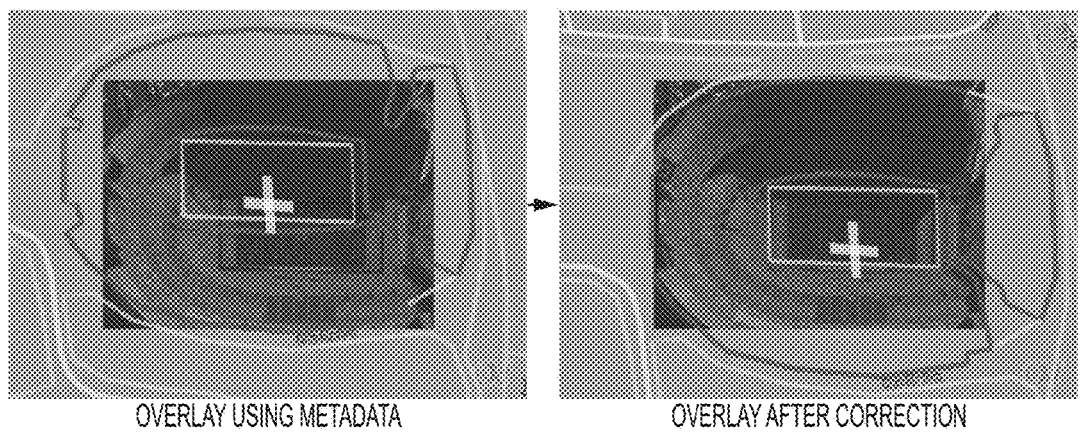
FIGS. 15A-15B shows an example of an overlay for a video frame of overhead view of the Ohio State stadium without and with metadata error correction using the present geo-registration techniques, respectively, according to embodiments.

FIGS. 15A-15B shows an example of an overlay for a video frame of overhead view of the Ohio State stadium without and with metadata error correction using the geo-registration techniques discussed above, respectively. As can been seen in FIG. 18A, the map data that is overlaid over the video frame is offset, such that the area of the football field, as shown by the rectangle, is offset from its actual position by an amount approximate to the width of the field. FIG. 18B show the overlay of the stadium after the metadata error correction, using the geo-registration techniques discussed above, with the location of the area of the football field substantially improved.

Figure 16A:
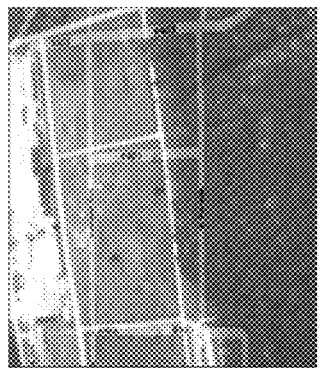
FIGS. 16A-16F show another example of the metadata error correction, using the present geo-registration techniques, according to embodiments.
Figure 16B:
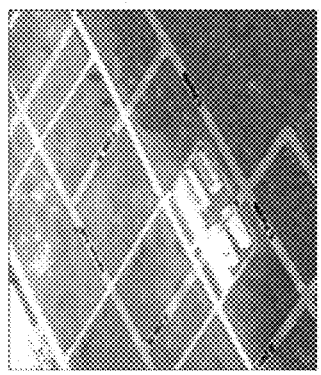
Figure 16C:
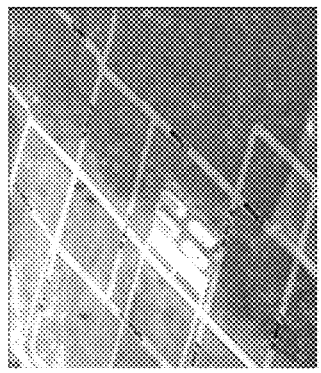
Figure 16D:
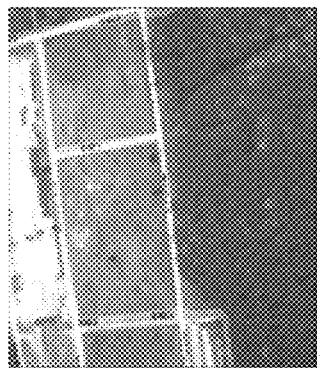
Figure 16E:
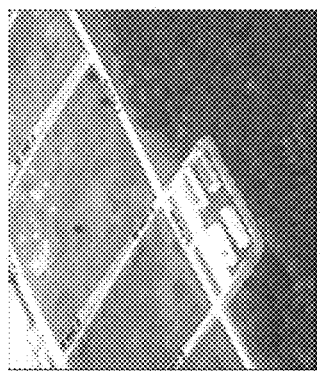
Figure 16F:
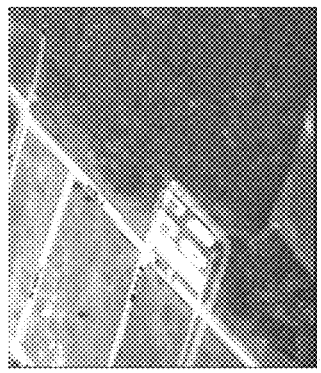

FIGS. 16A-16F show another example of the metadata error correction, using the geo-registration techniques discussed above. In FIGS. 16A-16C, three overlay images are shown of an area having several intersecting streets without the metadata error correction where the streets are offset from where they should actually be. FIGS. 16D-16F shows the frames with the metadata error correction where the street placement is greatly improved.

Figure 17:
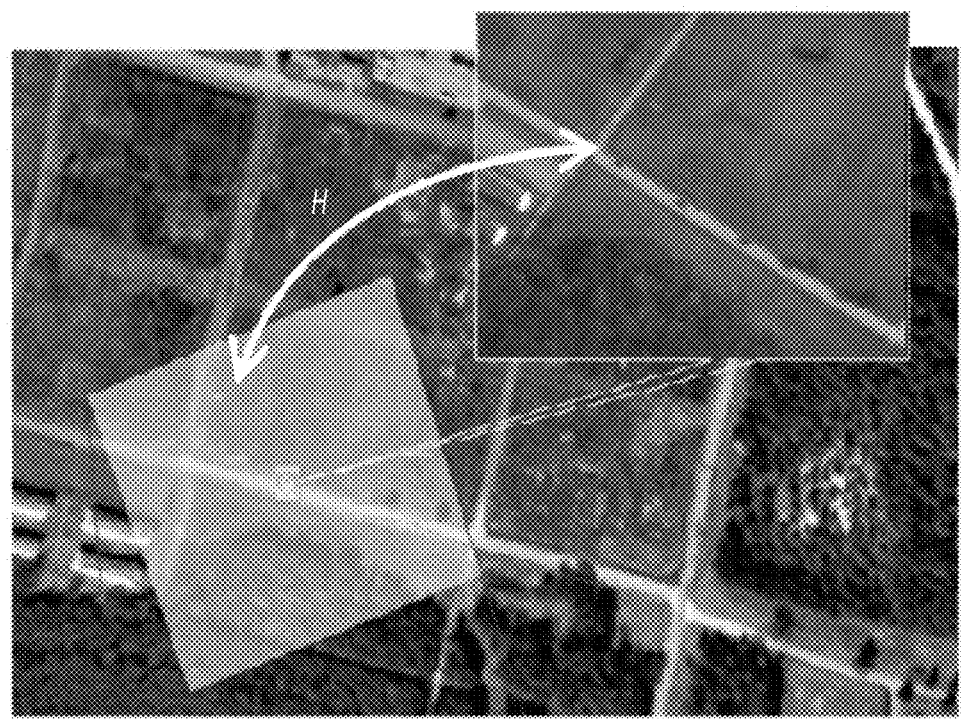
FIG. 17 shows an example of the homography H between the video image and the map data, according to embodiments.
Figure 18:
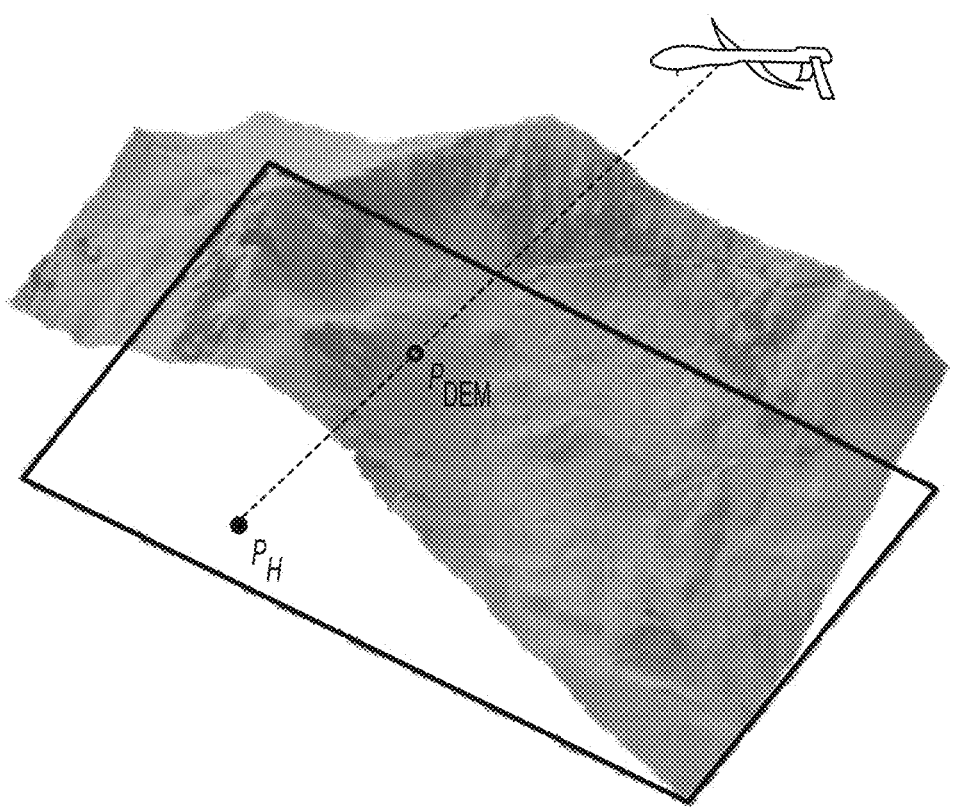
FIG. 18 shows an example homography for a feature point from a video image projected in 3D model created using the DEM data and map data according to embodiments.

FIG. 17 shows an example of the homography H between the video image and the map data, according to embodiments. FIG. 18 shows an example homography for a feature point from a video image projected in 3D model created using the DEM data and map data.

Flight simulation is a feature in terms of generating diverse video/metadata datasets across the earth globe, facilitating the mission training, preparation and analysis and also helping with framework debugging to make sure it works in different locations and functions seamlessly as the UAV flies over a short-term or long-term period. Integration the flight simulation and recording feature can include the following. A flight simulator class is added. The class stores a list of sensor parameters as the route. The route can be defined in a number of ways, for instance, circling around an area. The class also stores variables such as the video recording boolean to signal the recording mode, video sequence index to allow multiple recordings, the total frame count, and so on. The class can also preprocess the captured image so that they look different, for instance, turning the images into black and white ones. The route generation can be triggered by an interaction event. Once the flight simulation mode is on, the virtual sensor parameters will be updated based on the route definitions. The sensor metadata will be recorded when generating the route by taking the snapshots of the current states of the simulated sensors. In the video recording mode, only the map elevation overlay is drawn. The back buffer image is then captured and saved to disk.

The replay of the flight simulation can be implemented according to the following. Add a sensor simulator and related mechanism to the framework. The sensor simulator replicates largely the implementation of the virtual sensor. A list of sensor simulators is generated by parsing the metadata file and the view matrix is established. To work with the expanded context mode, the sensor horizontal field of view (FoV) is calculated based on the relationship equation of the expanded dimension, the original dimension and the original FoV. Then the projection matrix is updated given the expanded FoV. The method of screen coordinates to ground projection is implemented based on the relationship of the horizontal field of view, the aspect and the image dimension.

When the virtual sensor is translated, the virtual sensor can be moved along the initial sensor orientation instead of the world coordinate system. Therefore, a function to store the reference coordinate system can be added, which is usually the initial sensor pose, and used it to move/translate the virtual sensor. But when the sensor is rotated, its orientation will change immediately against its current pose. For instance, the orientation can be rotated against its current viewing direction. The target position can be updated based on the sensor's viewing direction.

The flight simulation routes can be defined in an arbitrary way. For example, an ellipse route can be implemented where the major and minor axis radius can be configured. The direction of the sensor is updated based on the ellipse tangent and the right hand rotation routine. The new sensor parameters are saved and the virtual sensor pose is also changed along with each simulation step. Then the rendering buffer content is processed and saved. In the flight simulation mode, the graphics context size is set to the video frame size. For the simulated sensor, its translation is predefined and its rotation matrix is calculated based on the current sensor pose, which correctly positions and orients the UAV from the virtual perspective.

According to some embodiments, sensor-to-target distance may change the font size. The sprite text rendering library generates the text metrics for a specified size on the CPU per string. When zooming in and out especially from the virtual perspective, the font size does not change unless all the strings metrics are recalculated for each frame, which typically incurs a significant CPU-GPU data transfer cost for rendering of large amount of texts. To address this issue, the start position for each string is recorded, the vertex data structure is modified to store it and pass in the start position into the position component, and a font scale variable is added in the sprite shader. Inside the geometry shader where the quad for a point is being generated, the start horizontal position is calculated based on the offset from the start position stored in the position component. All of the quad coordinates are then multiplied by the font scale value to scale the text. A IsFont Boolean is added to disable the sprite scaling in case of image rendering. The overlay framework is modified to compute the real font size based on the sensor position and target position on the ground, and then the real font size is passed to the text rendering library where the font scale is calculated and applied to all the buffered strings in the shader.

According to some embodiments, points of interest on the map can be located based on an address, a point, or a query. For the address option, latitude and longitude coordinates can be obtained for a location by specifying values such as a locality, postal code, and street address. For the point option, the location information associated with latitude and longitude coordinates can be obtained. For the query option, latitude and longitude coordinates can be obtained that correspond to location information provided as a query string. The URL templates tend to vary with different countries. The web response results can be saved as a list of the locations. The location information for each resource includes latitude and longitude coordinates, the type of location, and the geographical area that contains the location. To overlay the search results onto the map, a textures or other visual indicators can be used to identify each of the searched location. The screen coordinate from the first-person viewpoint can be calculated. In the first-person mode, a sprite texture is drawn at that coordinate per location. In the third-person mode, the 3D coordinate is used instead and the texture is facing or "billboarding" from the third-person viewpoint.

According to some embodiments, route data, i.e., walking, driving or transit route, can be provided by specifying a series of waypoints. A waypoint is a specified geographical location defined by longitude and latitude that is used for navigational purposes. The route includes information such as route instructions, travel duration, travel distance or transit information. A set of route points may also be specified. The web response results can be saved as a list of the routes. Multiple parameters can be used to calculate the routes such as, waypoints, via waypoints, avoid (highways, tolls, etc), distance before first turn, heading, optimize (distance, time, etc), route path output, tolerances, distance unit, date time, time type, max solutions, and travel mode (driving, walking, transit).

To overlay the route information onto the map, three textures indicating start, end and transit points can be drawn for each route. In addition, the route can be rendered as several path quads for each itinerary segment. The image texture coordinates can again be calculated so that the textures always face the third-person viewpoint. The image data and path data can be saved into two different types of buffers and rendered using different shaders in multiple rendering passes.

According to some embodiments, a traffic overlay on a map area may be generated. Display information regarding traffic incidents and issues, such as construction sites and traffic congestion can be provided in the overlay. A map area can be specified to search for traffic incident information. The size of the area can be a maximum of 500 km×500 km. The response returned by a traffic URL can contain one or more traffic incident resources. Each traffic incident resource can contain information about a traffic issues that met the criteria specified in the URL request, such as map area, incident type and severity. The web response result can be saved as a list of the traffic incidents. Multiple items can be returned in the traffic incident resources such as, point, congestion (generally slow, sluggish), description, detour, start, end, lane closure, last modified, road closure, severity, location codes, type, and verified.

To overlay the traffic incidents onto the map, four textures indicating severity levels (low impact, minor, moderate, serious) are drawn for each traffic incident at both the start and end points. In addition, the incident route can be rendered as several path quads for each traffic incident. Each incident route can be shaded in different colors indicating different incident types such as, accident, congestion, disabled vehicle, mass transit, misc, other news, planned event, road hazard, construction, alert, and/or weather. Like the route overlay, the image texture coordinates can also be calculated so that the textures always face the third-person viewpoint. The image data and path data can be saved into two different types of buffers and rendered using different shaders in multiple rendering passes.

According to some embodiments, a street map may have overlays of one or more label configurations; the label configurations may be color coded. The generic settings for OpenStreetMap can be passed into the shader, while the street width update requires the vertex buffer/geometry regeneration. The font rendering is refactored in a way that static text overlay is created to handle the label color, size, alpha, and visibility changes, the font pool manages the font creation and the sprite text renderer class handles the actual rendering based on user settings. According to some embodiments, a street map may include one or more of a MapElevation and LiDAR configurations According to some embodiments, a map provider (e.g. Google or Bing satellite maps, or VFR maps) may be shown with a range of zoom level and/or map scale.

According to some embodiments, a real-time overlay on a simulated dataset may have one or more of a compass, map, elevation and/or sky turned off.

According to some embodiments, flight simulation records and replays may be shown with first person or virtual perspective views are shown.

According to some embodiments, a sensor may be manipulated to provide an original first person view, an original virtual perspective view before or after virtual sensor update.

Figure 19A:
FIGS. 19A-19D show expanded context ratio=1.1, where
Figure 19B:
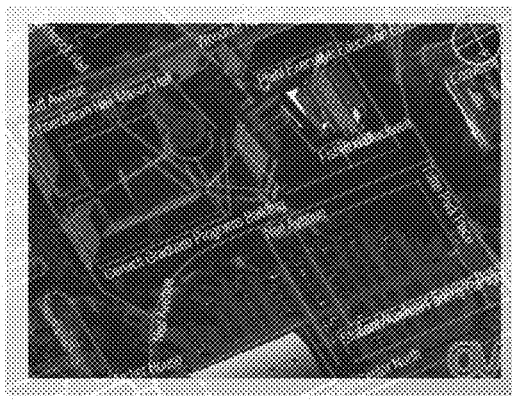
Figure 19C:
Figure 19D:
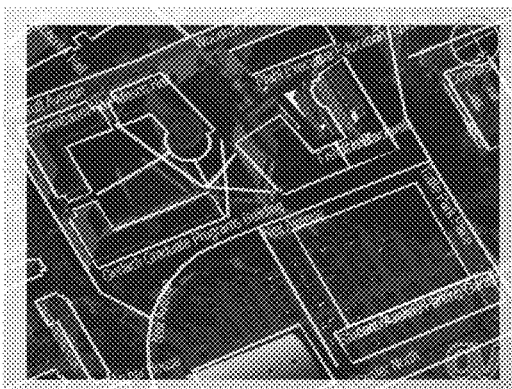
Figure 20B:
FIGS. 20A-20D show the rendering metrics for non-optimized vs. optimized 3D LiDAR rendering models with polygon reduction, according to embodiments.
Figure 20D:
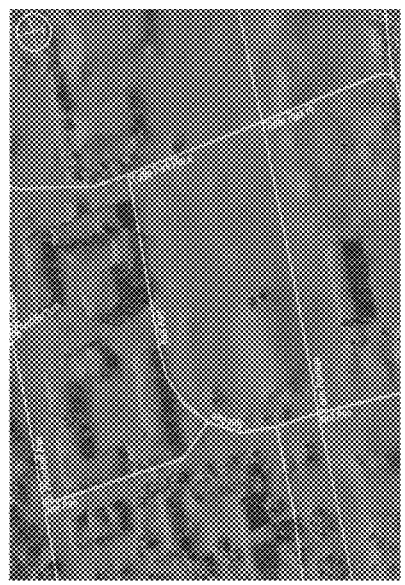
Figure 20A:
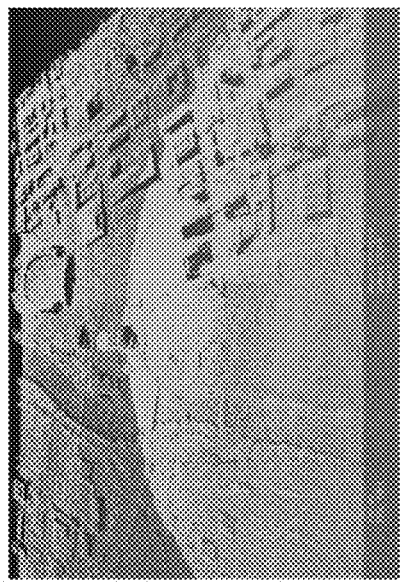
Figure 20C:
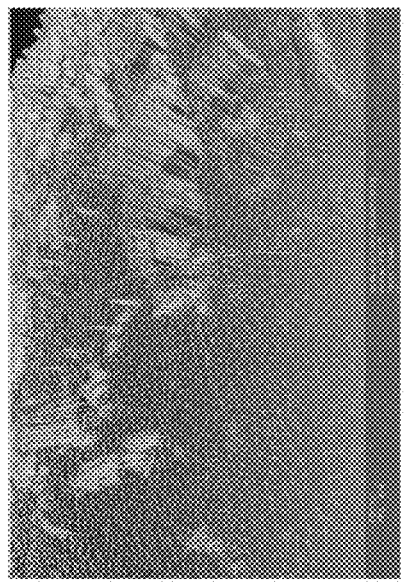

FIGS. 19A-19D show example expanded context ratio=1.1, where FIG. 19A shows user 1, occlusion alpha=1, FIG. 19B shows user 2, occlusion alpha=0.5, FIG. 19C shows user 3, occlusion alpha=0.7, and FIG. 19D shows user 4, occlusion alpha=0, according to embodiments.

According to some embodiments, a virtual map may show a flight simulation or virtual perspective view.

According to some embodiments, DEM data may be rendered with a coarse mesh (cell size 8) without detail tessellation, to provide a wireframe or solid model. Rendering a coarse mesh with detail tessellation preserves terrain dynamic features along the area more bumpy or irregular without processing large number of vertices in the static partition mode. Terrain dynamics are preserved with variant cell sizes, from cell size 4 to cell size 16, and may be preserved even with larger cell sizes.

According to some embodiments, dynamic terrain tessellation may be based on viewing distance. Patches closer to the sensor would result in more tessellations compared to those farther from the sensor.

According to some embodiments, dynamic terrain sampling based on viewing distance from the original sensor (frustum culling and shading) may be performed; shading may be based on elevation, according to embodiments; the viewing frustum culling from the virtual perspective with the original sensor frustum parameters may be used as shader input. A cushion area can be optionally added to that inside the viewing frustum for further processing.

Performance testing was conducted on the system to determine the per frame latency imposed by the overlay rendering process. Measurements were collected for both CPU and GPU processing. CPU metrics were collected using the .NET Framework's Stopwatch class which has a reported 500 nanosecond resolution. Measurements were collected over a 2 second period and then average to eliminate outliers. A GPU profiling utility was integrated into the framework and used to capture metrics regarding processing on the specialized hardware.

Tests were conducted on three sets of hardware platforms to profile performance under different conditions. The first platform was a mid-grade workstation that was comprised of an Intel Xeon 8-core CPU and an nVidia GeForce GTX 670 GPU. Multi-sample anti-aliasing was enabled with a sample count of 4 and quality level of 3. Testing was also performed on two low-power microprocessors: Intel Haswell Core i3 processor, 4 GB DDR3 RAM, and HD 4400 graphics running Windows 7 x64 and Intel Baytrail Quad Core processor running Windows 8.1 x86 (Windows x64 is not yet available on the Baytrail architecture).

It was determined that rendering performance is variable based on the nature of the data contained within a layer. Bottlenecks were found to primarily reside in three types of overlay layers: Digital Elevation Map (DEM), layers containing text such as OpenStreetMap, and high-resolution point clouds such as LiDAR. Based on this observation different approaches were implemented to optimize rendering for each type of data DEM data rendering was optimized using GPU dynamic tessellation to reduce the number of vertices transferred to the GPU while still preserving adequate terrain details.

Table lists the performance comparisons between the unoptimized method and the dynamic tessellation methods with different cell sizes and frustum culling disabled. The frame buffer size used for this comparison was 1024×768 pixels. The larger the cell size is, the smaller amount of vertices will be generated on CPU. A comparison of the performance tests shows that 8.2×, 11.7×, 14.6× speedups are achieved for cell size 8, 12, and 16.

TABLE 3

DEM rendering metrics

| Rendering Method | Average Draw Time (ms) | | |
|---|---|---|---|
| | CPU | GPU | Speedup |
| Static Tessellation | 0 | 0.614 | |
| Dynamic Tessellation (Cell size 8) | 0 | 0.075 | 8.2x |
| Dynamic Tessellation (Cell size 12) | 0 | 0.055 | 11.7x |
| Dynamic Tessellation (Cell size 16) | 0 | 0.042 | 14.6x |

The initial approach to rendering sprite text incurred a large CPU/GPU overhead when there were thousands of characters to render per frame, such was the case with road and street names in the OpenStreetMap layer and the messages in the Twitter layer. This overhead was caused primarily two factors: 1) a single rendering pass was required for each character; and 2) GPU parameters were needlessly being reconfigured on each rendering pass.

The text rendering was optimized by consolidating all character data for a frame into a single vertex buffer and performing a single rendering pass to draw the text to the new video frame. This produced significantly better results, however, there are several challenges that had to be addressed. Some text elements are static, such as those from OpenStreetMap, and may benefit from a pre-compute process while other texts are purely dynamic, such as the Twitter layer text elements. The position and orientation of the static text may be change from frame to frame and text transformations (position and rotations) incur penalties in memory and speed. Dynamic text rendering requires updating the vertex buffer per frame negating some of the performance gains achieved by the approach.

To address the above considerations, two vertex buffers were set up; one for the static text elements such as OSM road names and another for the dynamic text such as the Twitter messages. For static text rendering, a shader pass and associated data structures were added to calculate text transformations in the geometry shader. To reduce the local memory usage, a serial of projection, translation, rotation and scaling functions were used to directly calculate the transformed vertex position given minimum number of parameters. Then each quad vertex was transformed based on a point input from the vertex shader.

For dynamic text rendering, all text elements for a given layers were queued in a frame, and then a single pass was used to draw the text of them using a simple vertex/geometry/pixel shader combination. In the overlay engine, static strings are queued in a pre-process step performed at creation/loading of the overlay reference data; then all dynamic and static text elements are drawn at the end of the frame.

Table 4 lists the performance comparisons of the original method versus the optimized approaches.

TABLE 4

Static and dynamic text rendering metrics

| Rendering Method | Average Draw Time (ms) | | |
|---|---|---|---|
| | CPU | GPU | Speedup |
| Non-Optimized Text Rendering | 19 | 28.8 | |
| Optimized Text Rendering | 0 | 0.007 | 6828x |

OpenStreetMap layers also include hundreds of road segments. In the original approach, hundreds of passes would be launched with each road corresponding to a rendering pass. There are hundreds of vertex buffers associated with each road and redundant GPU parameter configurations in draw calls.

Similar to the optimization for static text rendering, a single vertex buffer was used to recursively store all the road vertex data at the top level of the rendering tree. The vertex buffer primitive type is changed from triangle strip to triangle list to allow for single buffer based rendering. Then a single rendering pass is launched per overlay layer. Table 5 lists the rendering metrics of the original method and the optimized approach. As shown, there is a 75× performance boost.

TABLE 5

OpenStreetMap rendering metrics

| Rendering Method | Average Draw Time (ms) | | |
|---|---|---|---|
| | CPU | GPU | Speedup |
| Non-Optimized OpenStreetMap Rendering | 1.1 | 6.3 | |
| Optimized OpenStreetMap Rendering | 0 | 0.008 | 925x |

LiDAR data can be used to display detailed terrain surface details by storing mappings between geo-coordinates and pixels in a data structure known as a point cloud. High-resolution (smaller distances between geo-coordinates) LiDAR datasets can potentially provide fine surface details. It was found that rendering LiDAR datasets, even for a small areas causing significant rendering delays. This is due to the large number of 3D triangles need to produce the level-of-detail available in a LiDAR dataset.

Since the LiDAR data model is a type of terrain data and generated from a point cloud, using dynamic tessellation to reduce the renderable vertices (as was done with the DEM optimizations) could also be applied for performance gains. There is an uncompressed point cloud data format (.LAS) and compressed formats (.SID or .LAZ). The point cloud data from the public United States Geological Survey ("USGS") dataset web site was used with several tools such as GDAL, LasTools and GRASS GIS libraries. The LasTools (http://www.cs.unc.edu/~isenburg/lastools/) Las2DEM utility triangulates the point data and then generates DEM data in a variety of formats including ESRI Grid ASCII with different step sizes. To import the ESRI Grid data, the GDAL library (http://www.gdal.org/) was integrated that processes raster geospatial data formats including USGS DEM format, and MrSID compressed LiDAR data format using the LizardTech library. Additional metadata such as geo coordinate bounds need to be extracted from the LiDAR data xml file. After that, the LiDAR data is processed and rendered with the dynamic tessellation approach. Table 6 lists the rendering metrics before and after the optimizations.

TABLE 6

LiDAR rendering metrics (virtual perspective): Non-optimized vs. optimized with point cloud to DEM conversion and dynamic tessellation

| Rendering Method | Average Draw Time (ms) | | |
|---|---|---|---|
| | CPU | GPU | Speedup |
| Non-Optimized LiDAR Rendering | 0 | 6.289 | |
| LiDAR Rendering with DEM and dynamic tessellation | 0 | 0.278 | 22.6x |

While the first approach significantly improved the rendering performance with 22.6x speedup and the LiDAR data looks similar to the original one from the virtual perspective, it suffered from detail or accuracy loss when viewing from the first person perspective. To tackle the issue, CPU based spatial partitioning was applied to render the LiDAR model since only a small portion of the whole dataset is visualized from the first person viewpoint.

After the dataset is loaded, it was partitioned evenly given the latitude and longitude boundary. Each partition corresponds to a mesh object with associated vertex data and the indices data. Since the range of vertex data is changed, the values in the original indices array need adjustment as well. This was accomplished with the auxiliary vectors to record the old and new vertex ID in a new partition. Some triangles may span more than one partition, in which case the triangle vertices were all placed in the same partition and their indices are updated accordingly.

In each of the model overlay objects, a check was performed by testing to determine if there was overlap between the frame boundary and the model boundary. A render pass is then launched if overlap is detected. With the optimal partition count, only 2 to 4 partitions need to be rendered most of time. Table 7 lists the rendering metrics for the non-optimized vs. optimized version.

TABLE 7

LiDAR rendering metrics: Non-optimized vs. Optimized with CPU based spatial partitioning

| Rendering Method | Average Draw Time (ms) | | |
|---|---|---|---|
| | CPU | GPU | Speedup |
| Non-Optimized LiDAR Rendering | 0 | 6.3 | |
| Optimized LiDAR Rendering with CPU based spatial partitioning | | 0.8 | 7.88x |

Performance improvements from the CPU based spatial partitioning were limited due to the large number of vertices per partition and the extra rendering passes launched for multiple partitions. A close check of the LiDAR mesh revealed there was large space for polygon reduction in the relatively flat areas of the landscape. An open source tool called MeshLab httplimeshlab.sourceforge.net/ was used for polygon reduction and face normal smoothing of the LiDAR reference data. Since the tool only accepts certain model formats, an Obj model importer and exporter was added to the overlay engine. After the geometry refinement, the model was read and displayed from the first person viewing perspective. FIGS. 20A-20D shows the polygon reduction and face normal smoothing from the MeshLab tool and the overlay engine. The model is now closer to the original appearance. FIGS. 20A-20D show the rendering metrics for non-optimized vs. optimized 3D LiDAR rendering models with polygon reduction. The performance boost with 23× speedup is close to the first approach (Table 8).

TABLE 8

LiDAR rendering metrics (first person perspective): Non-optimized vs. Optimized with polygon reduction and CPU spatial partitioning

| Rendering Method | Average Draw Time (ms) | | |
|---|---|---|---|
| | CPU | GPU | Speedup |
| Non-Optimized LiDAR Rendering | 0 | 6.3 | |
| LiDAR Rendering with polygon reduction and CPU spatial partitioning | 0 | 0.27 | 23x |

Table 9 lists the overall rendering performance metrics for virtual perspective without frustum culling vs. first person perspective with frustum culling. The LiDAR rendering in virtual perspective utilizes DEM conversion plus dynamic tessellation, while in first person perspective utilizes CPU spatial partitioning and polygon reduction. Now the total rendering time from either perspective is close to each other and below 0.4 ms, which is significantly reduced after optimizations discussed above.

TABLE 9

Rendering metrics for all layers after performance optimization

| Perspective | Overlay Layer Type | Average Draw Time (ms) | |
|---|---|---|---|
| | | CPU | GPU |
| First Person Perspective | Scene Overlay | 0 | 0.00002 |
| | Screen Overlay | 0 | 0.0012 |
| | OpenStreetMap | 0 | 0.004 |
| | LiDAR | 0 | 0.27 |
| | DigitalElevationMap | 0 | 0.03 |
| | Total | 0 | 0.30522 |
| Virtual Perspective | Scene Overlay | 0 | 0.0013 |
| | Screen Overlay | 0 | 0.0006 |
| | OpenStreetMap | 0 | 0.0193 |
| | LiDAR | 0 | 0.278 |
| | DigitalElevationMap | 0 | 0.0982 |
| | Total | 0 | 0.3974 |

Additional performance testing was conducted on the system's rendering pipeline on lower end hardware to determine if the system could be run in a constrained environment. Tests were performed on two low-power microprocessors: Intel Haswell Core i3 processor, 4 GB DDR3 RAM, and HD 4400 graphics running Windows 7 x64 and Intel Baytrail Quad Core processor running Windows 8.1 x86 (Windows x64 is not yet available on the Baytrail architecture).

Testing was also done to determine the feasibility of running the system on lower-cost, resource constrained hardware. Testing and analysis efforts focused on the OpenStreetMap, Digital Elevation Map, and LiDAR layers as these were previously identified as the most performance constrained layers. The numbers below show the results from this testing. Results indicate that the system is capable of running within acceptable operating limits (assuming that most videos typically run between 60 fps and 120 fps) even in lower grade hardware (Table 10).

TABLE 10

Performance test results for the Haswell and Baytrail microprocessors

| | Haswell | Baytrail |
|---|---|---|
| OpenStreetMap | 0.176 ms (5693 fps) | 0.651 ms (1642 fps) |
| Digital Elevation Map | 0.359 ms (2787 fps) | 1.426 ms (701 fps) |
| LiDAR | 0.135 ms (7432 fps) | 0.398 ms (2513 fps) |
| Total | 0.670 ms (1492 fps) | 2.469 ms (405 fps) |

The foregoing description is illustrative, and variations in configuration and implementation can occur to persons skilled in the art. For instance, the various illustrative logics, logical blocks, modules, components and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more examples, the functions and operations described can be implemented in hardware, software, firmware, or any combination thereof. For a software implementation, the techniques described herein can be implemented with modules (e.g., procedures, functions, subprograms, programs, routines, subroutines, components, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 21:
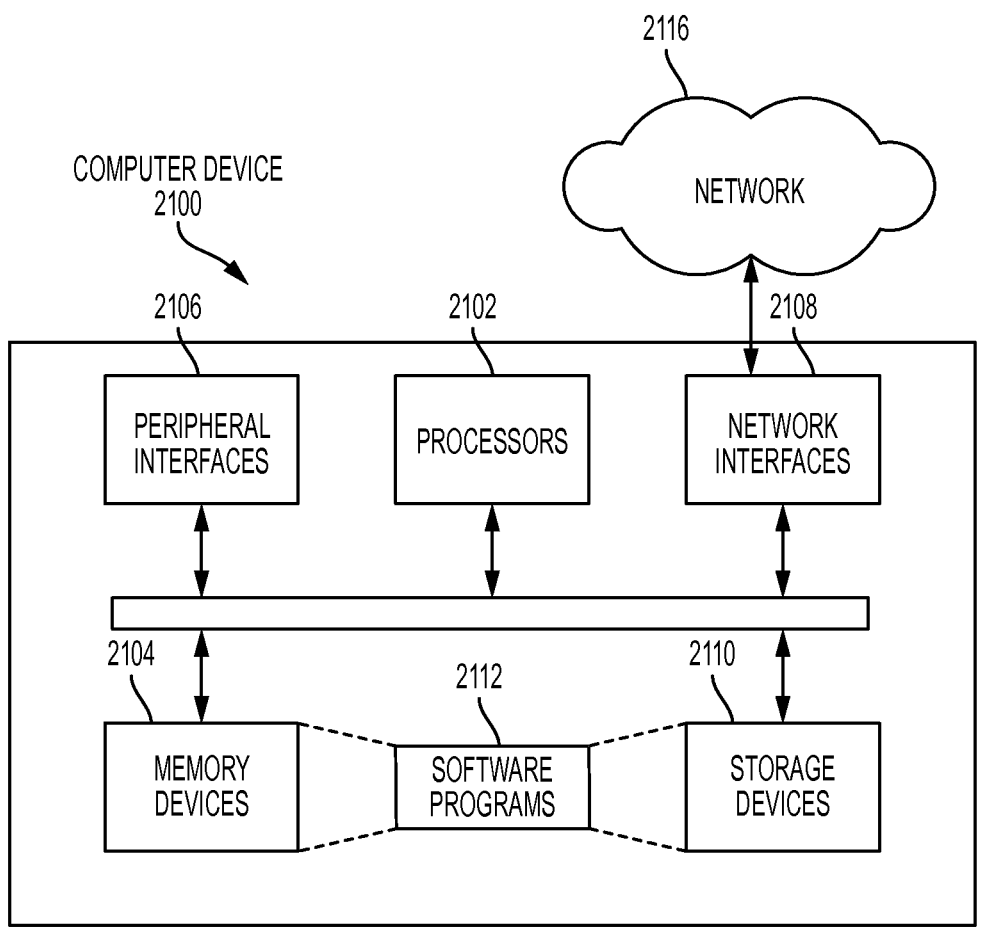
FIG. 21 illustrates an example of a hardware configuration for a computer device that can be used to perform one or more of the processes, functions, or operations described herein.

For example, FIG. 21 illustrates an example of a hardware configuration for a computer device 2100 that can be used to perform one or more of the processes, functions, frameworks, modules, threads, objects, or operations described above. While FIG. 21 illustrates various components contained in the computer device 2100, FIG. 21 illustrates but one example of a computer device and additional components can be added and existing components can be removed.

The computer device 2100 can be any type of computer devices, such as desktops, laptops, servers, etc., or mobile devices, such as smart telephones, tablet computers, cellular telephones, personal digital assistants, etc. As illustrated in FIG. 21, the computer device 2100 can include one or more processors 2102 of various core configurations and clock frequencies. The computer device 2100 can also include one or more memory devices 2104 that may be non-transitory and that may serve as a main memory during the operation of the computer device 2100. For example, during operation, a copy of the software (e.g., 2112) that implements the above-described features, operations, functions, or methods can be stored in the one or more memory devices 2104. The computer device 2100 can also include one or more peripheral interfaces 2106, such as keyboards, mice, touchpads, computer screens, touchscreens, etc., for enabling human interaction with and manipulation of the computer device 2100.

The computer device 2100 can also include one or more network interfaces 2108 for communicating via one or more networks 2116, such as Ethernet adapters, wireless transceivers, or serial network components, for communicating over wired or wireless media using protocols. The computer device 2100 can also include one or more storage device 2110 of varying physical dimensions and storage capacities, such as flash drives, hard drives, random access memory, etc., for storing data, such as images, files, and program instructions for execution by the one or more processors 2102. The storage device 2110 may include a non-transitory storage medium.

Additionally, the computer device 2100 can include one or more software programs 2112 that enable the functionality of the features described herein. The one or more software programs 2112 can include instructions that cause the one or more processors 2102 to perform the processes, functions, and operations described herein. Copies of the one or more software programs 2112 can be stored in the one or more memory devices 6504 and/or on in the one or more storage devices 2110. Likewise, the data, i.e., supplemental data (DEM, LiDAR, map data), libraries, etc., utilized by one or more software programs 2112 can be stored in the one or more memory devices 2104 and/or on in the one or more storage devices 2110.

In various implementations, the computer device 2100 can communicate via a network 2116. The network 2116 can be any type of network, such as a local area network, a wide-area network, a virtual private network, the Internet, an intranet, an extranet, a public switched telephone network, an infrared network, a wireless network, and any combination thereof. The network 2116 can support communications using any of a variety of commercially-available protocols, such as TCP/IP, UDP, OSI, FTP, UPnP, NFS, CIFS, AppleTalk, and the like.

The computer device 2100 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 2100 as described above need not be enclosed within a single enclosure or even located in close proximity to one another. Those skilled in the art will appreciate that the above-described componentry are examples only, as the computer device 2100 can include any type of hardware componentry, including any necessary accompanying firmware or software, for performing the disclosed implementations. The computer device 2100 can also be implemented in part or in whole by electronic circuit components or processors, such as application-specific integrated circuits (ASICs) or field-programmable gate arrays (FPGAs).

If implemented in software, the processes, methods, functions, and operations described herein can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A method for providing an augmented video feed obtained by a camera of a manned or unmanned aerial vehicle ("UAV") to a user interface ("UI"), the method comprising:

obtaining a sequence of video images with or without corresponding sensor metadata from the aerial vehicle;

obtaining supplemental data based on the sequence of video images and the sensor metadata;

correcting, by a processor, an error in the sensor metadata using a reconstruction error minimization technique;

creating, by a processor, a geographically-referenced scene model based on a coordinate system that is registered to the sequence of video images;

overlaying the supplemental data onto the geographically-referenced scene model by rendering geo-registered data from a 3D perspective that matches a corrected camera model;

creating a video stream of a virtual representation from the scene from the perspective of the camera based on the overlaying; and providing the video stream to a UI to be rendered onto a display, and wherein the correcting the error in the sensor metadata further comprises:

performing a first registration between a video image in the sequence of video images and a corresponding map data;

determining an anchor frame from the sequence of video images; and performing a second registration between the video image and the corresponding map data using the anchor frame by minimizing a reprojection error.

2. The method of claim 1, wherein the supplemental data comprises one or more of: static geo-referenced datasets, dynamical geo-referenced datasets, traffic conditions, elevation data, terrain data, social media information, waypoint data, light detection and ranging ("LIDAR") data, airspace symbology data, 3D model data, and road maps.

3. The method of claim 1, wherein the error in the sensor metadata comprises one or more of: missing data, temporal drift, and spatial drift.

4. The method of claim 1, wherein the correcting the error in the sensor metadata for one image frame is based on another image frame or map data corresponding to a scene that is represented in the one image.

5. The method of claim 1, further comprising:
constructing a depth map using light detection and ranging ("LIDAR") or digital elevation maps ("DEM");
determining that one or more pixels representing overlay objects has low or no visibility for a video frame based the depth map; and
rendering the one or more pixels in a manner to represent that the one or more pixels are occluded.

6. The method of claim 1, wherein the minimizing the reprojection error is performed using the reconstruction error minimization technique according to:

$$\min(H)R_{g(v,m,H)} = \min(H)\Sigma_{j=1}^{n}(|p_j^v - Hp_j^m| + |p_j^m - H^{-1}p_j^v|)/n, \text{ where}$$

subject to H to be close to rigid body geometry, and v is a frame of input image, m is cropped map imagery, $R_g$ is reconstruction error of feature points, j where j=1, ..., n, where n is a number of corresponding points.

7. A method for providing an augmented video feed obtained by a camera of a manned or unmanned aerial vehicle ("UAV") to a user interface ("UI"), the method comprising:
obtaining a sequence of video images with or without corresponding sensor metadata from the aerial vehicle;
obtaining supplemental data based on the sequence of video images and the sensor metadata;
correcting, by a processor, an error in the sensor metadata using a reconstruction error minimization technique;
creating, by a processor, a geographically-referenced scene model based on a coordinate system that is registered to the sequence of video images;
overlaying the supplemental data onto the geographically-referenced scene model by rendering geo-registered data from a 3D perspective that matches a corrected camera model;
creating a video stream of a virtual representation from the scene from the perspective of the camera based on the overlaying; and
providing the video stream to a UI to be rendered onto a display and, wherein the reconstruction error is minimized using a Lagrange optimization technique to obtain a final homography between map data and the video images.

8. The method of claim 1, wherein the supplemental data comprises information beyond a field-of-view of the camera of the aerial vehicle.

9. The method of claim 1, further comprising:
obtaining a series of waypoint data, wherein the series comprises a beginning waypoint, one or more intermediate waypoints, and a destination waypoint;
generating a flight path based on the series of waypoint data; and
outputting the flight path to the UI.

10. The method of claim 1, further comprising generating the UI that shows the supplemental data overlaid over the video stream and the sensor metadata.

11. A device for providing an augmented video feed obtained by a camera of a manned or unmanned aerial vehicle ("UAV") to a user interface ("UI"), the device comprising:
a memory containing instructions; and
at least one processor, operably connected to the memory, which executes the instructions to perform a method for providing an augmented video feed obtained by a camera of a manned or unmanned aerial vehicle ("UAV") to a user interface ("UI"), comprising:
obtaining a sequence of video images with or without corresponding sensor metadata from the aerial vehicle;
obtaining supplemental data based on the sequence of video images and the sensor metadata;
correcting, by a processor, an error in the sensor metadata using a reconstruction error minimization technique;
creating, by a processor, a geographically-referenced scene model based on a coordinate system that is registered to the sequence of video images;
overlaying the supplemental data onto the geographically-referenced scene model by rendering geo-registered data from a 3D perspective that matches a corrected camera model;
creating a video stream of a virtual representation from the scene from the perspective of the camera based on the overlaying;
providing the video stream to a UI to be rendered onto a display, and
constructing a depth map using light detection and ranging ("LIDAR") or digital elevation maps ("DEM");
determining that one or more pixels representing overlay objects has low or no visibility for a video frame based the depth map; and
rendering the one or more pixels in a manner to represent that the one or more pixels are occluded, and
wherein the correcting the error in the sensor metadata further comprises:
performing a first registration between a video image in the sequence of video images and a corresponding map data;
determining an anchor frame from the sequence of video images; and
performing a second registration between the video image and the corresponding map data using the anchor frame by minimizing a reprojection error.

12. The device of claim 11, wherein the minimizing the reprojection error is performed using the reconstruction error minimization technique according to:

$$\min(H)R_{g(v,m,H)} = \min(H)\Sigma_{j=1}^{n}(|p_j^v - Hp_j^m| + |p_j^m - H^{-1}p_j^v|)/n, \text{ where}$$

subject to H to be close to rigid body geometry, and v is a frame of input image, m is cropped map imagery, $R_g$ is reconstruction error of feature points, j where j=1, ..., n, where n is a number of corresponding points.

13. The device of claim 12, wherein the reconstruction error is minimized using a Lagrange optimization technique to obtain a final homography between map data and the video images.

14. A computer non-transitory readable storage medium comprising instructions for causing one or more processors to perform a method, the method for discerning a vehicle at an access control point, the method comprising:
obtaining a sequence of video images with or without corresponding sensor metadata from the aerial vehicle;
obtaining supplemental data based on the sequence of video images and the sensor metadata;

correcting, by a processor, an error in the sensor metadata using a reconstruction error minimization technique;

creating, by a processor, a geographically-referenced scene model based on a coordinate system that is registered to the sequence of video images;

overlaying the supplemental data onto the geographically-referenced scene model by rendering geo-registered data from a 3D perspective that matches a corrected camera model;

creating a video stream of a virtual representation from the scene from the perspective of the camera based on the overlaying; and providing the video stream to a UI to be rendered onto a display, and wherein the correcting the error in the sensor metadata further comprises:

performing a first registration between a video image in the sequence of video images and a corresponding map data;

determining an anchor frame from the sequence of video images; and performing a second registration between the video image and the corresponding map data using the anchor frame by minimizing a reprojection error.

15. The computer readable storage medium of claim 14, wherein the minimizing the reprojection error is performed using the reconstruction error minimization technique according to:

$$\min(H)R_{g(v,m,H)} = \min(H)\Sigma_{j=1}^{n}(|p_j^v - Hp_j^m| + |p_j^m - H^{-1}p_j^v|)/n, \text{ where}$$

subject to H to be close to rigid body geometry, and v is a frame of input image, m is cropped map imagery, $R_g$ is reconstruction error of feature points, j where j=1, ..., n, where n is a number of corresponding points.

* * * * *

UNITED STATES PATENT AND TRADEMARK OFFICE
CERTIFICATE OF CORRECTION

PATENT NO. : 9,996,976 B2
APPLICATION NO. : 14/703633
DATED : June 12, 2018
INVENTOR(S) : Shirley Zhou et al.

Page 1 of 1

It is certified that error appears in the above-identified patent and that said Letters Patent is hereby corrected as shown below:

In the Claims

Claim 14, Column 44, Line 60:
"A computer non-transitory readable storage medium" should read --A non-transitory computer readable storage medium--

Signed and Sealed this
Fourth Day of September, 2018

Andrei Iancu
*Director of the United States Patent and Trademark Office*